(12) United States Patent
Kang et al.

(10) Patent No.: US 11,320,832 B2
(45) Date of Patent: May 3, 2022

(54) METHOD AND APPARATUS WITH EGO MOTION INFORMATION ESTIMATION

(71) Applicant: Samsung Electronics Co., Ltd., Suwon-si (KR)

(72) Inventors: Nahyup Kang, Seoul (KR); Hyun Sung Chang, Seoul (KR); Kyungboo Jung, Seoul (KR); Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 16/547,859

(22) Filed: Aug. 22, 2019

(65) Prior Publication Data

US 2020/0319652 A1    Oct. 8, 2020

(30) Foreign Application Priority Data

Apr. 2, 2019    (KR) .................. 10-2019-0038508

(51) Int. Cl.
    *G05D 1/02*    (2020.01)
    *G06T 7/579*   (2017.01)
    *G05D 1/00*    (2006.01)

(52) U.S. Cl.
    CPC ......... *G05D 1/0246* (2013.01); *G05D 1/0088* (2013.01); *G05D 1/027* (2013.01); *G06T 7/579* (2017.01); *G05D 2201/0213* (2013.01)

(58) Field of Classification Search
    CPC .... G05D 1/0246; G05D 1/0088; G05D 1/027; G05D 2201/0213; G06T 7/579
    See application file for complete search history.

(56) References Cited

U.S. PATENT DOCUMENTS

| 9,148,652 B2 | 9/2015 | Chandraker et al. |
| 9,430,847 B2 | 8/2016 | Ramalingam et al. |
| 10,163,220 B2 * | 12/2018 | Cao ................ G06K 9/00651 |

(Continued)

FOREIGN PATENT DOCUMENTS

| KR | 10-1803340 B1 | 12/2017 |
| KR | 10-186660 B1 | 6/2018 |

(Continued)

OTHER PUBLICATIONS

Parisotto, Emilio et al., "Global Pose Estimation with an Attention-Based Recurrent Network", *2018 IEEE/CVF Conference on Computer Vision and Pattern Recognition Workshops (CVPRW)*, 2018 (pp. 1-10).

(Continued)

*Primary Examiner* — Ramsey Refai
(74) *Attorney, Agent, or Firm* — NSIP Law

(57) ABSTRACT

A processor-implemented method includes: estimating, from frame images of consecutive frames acquired from one or more sensors, short-term ego-motion information of the one or more sensors; estimating long-term ego-motion information of the one or more sensors from the frame images; determining attention information from the short-term ego-motion information and the long-term ego-motion information; and determining final long-term ego-motion information of a current frame, of the consecutive frames, based on the long-term ego-motion information and the attention information.

24 Claims, 16 Drawing Sheets

(56) References Cited

U.S. PATENT DOCUMENTS

| | | | |
|---|---|---|---|
| 2011/0074927 A1* | 3/2011 | Perng | G06T 7/579 348/46 |
| 2012/0050496 A1* | 3/2012 | Nishigaki | G06T 7/254 348/49 |
| 2014/0212001 A1 | 7/2014 | Perlin et al. | |
| 2017/0277197 A1* | 9/2017 | Liao | G06T 7/20 |
| 2018/0322640 A1* | 11/2018 | Kim | G06T 7/70 |

FOREIGN PATENT DOCUMENTS

| | | |
|---|---|---|
| KR | 10-1851155 B1 | 6/2018 |
| KR | 10-1880678 B1 | 7/2018 |
| KR | 10-2018-0109190 A | 10/2018 |

OTHER PUBLICATIONS

Rosenbaum, Dan, et al. "Learning models for visual 3d localization with implicit mapping." *arXiv preprint arXiv:1807.03149*, Jul. 4, 2018 (pp. 1-14).

Lin, Yimin et al., "Deep Global-Relative Networks for End-to-End 6-DoF Visual Localization and Odometry, 16th Pacific Rim International Conference on Artificial Intelligence, Cuvu, Yanuca Island, Fiji, Aug. 26-30, 2019, Proceedings, Part II" *In: "12th European Conference on Computer Vision, ECCV2012"*, Dec. 19, 2018 (6 pages in English).

Joseph, Tony et al., "UAN: Unified Attention Network for Convolutional Neural Networks", *arxiv.org*, Cornell University Library, 201 Olin Library Cornell University Ithaca, NY 14853, Jan. 16, 2019 (pp. 1-17).

Extended European Search Report dated Apr. 29, 2020 in counterpart European Patent Application No. 19203977.4 (6 pages in English).

Konda K., et al., "Learning Visual Odometry With a Convolutional Network", *VISAPP*, 2015, pp. 486-490 (5 pages in English).

Kim N., et al., "Multispectral Transfer Network: Unsupervised Depth Estimation for All-Day Vision", *Thirty-Second AAAI Conference on Artificial Intelligence*, Apr. 2018, pp. 6983-6991 (9 pages in English).

Yang N., et al., "Deep Virtual Stereo Odometry: Leveraging Deep Depth Prediction for Monocular Direct Sparse Odometry", *Proceedings of the European Conference on Computer Vision (ECCV)*, 2018, pp. 817-833(18 pages in English).

* cited by examiner

METHOD AND APPARATUS WITH EGO MOTION INFORMATION ESTIMATION

CROSS-REFERENCE TO RELATED APPLICATIONS

This application claims the benefit under 35 USC § 119(a) of Korean Patent Application No. 10-2019-0038508 filed on Apr. 2, 2019 in the Korean Intellectual Property Office, the entire disclosure of which is incorporated herein by reference for all purposes.

BACKGROUND

1. Field

The following description relates to methods and apparatuses with ego motion estimation.

2. Description of Related Art

Devices such as an autonomous vehicle, an advanced driver assistance system (ADAS) applied vehicle, a mobile robot, and a drone may recognize a position of the corresponding device itself. For example, a device may determine its position using information collected through a global navigation satellite system (GNSS) or the like. However, in an obstructed (e.g., shaded or underground) region where GNSS signals are not collected, it may be difficult for the device to accurately determine its position.

To ensure an operation in the shaded region of the GNSS, the autonomous vehicle may track information associated with a relative position of the device itself through an odometry.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes: estimating, from frame images of consecutive frames acquired from one or more sensors, short-term ego-motion information of the one or more sensors; estimating long-term ego-motion information of the one or more sensors from the frame images; determining attention information from the short-term ego-motion information and the long-term ego-motion information; and determining final long-term ego-motion information of a current frame, of the consecutive frames, based on the long-term ego-motion information and the attention information.

The determining of the final long-term ego-motion information of the current frame may include correcting the long-term ego-motion information using the attention information.

The determining of the final long-term ego-motion information may include determining an ego-motion variation of the one or more sensors from a long-term reference frame to the current frame, and a frame before a predetermined number of frames from the current frame is determined as the long-term reference frame.

The method may include determining final short-term ego-motion information of the current frame based on the determined final long-term ego-motion information.

The determining of the final short-term ego-motion information may include: determining the final short-term ego-motion information of the current frame based on final long-term ego-motion information of a frame previous to the current frame among the consecutive frames, final short-term ego-motion information of a long-term reference frame, and the final long-term ego-motion information of the current frame.

The frame previous to the current frame may be directly adjacent to the current frame among the consecutive frames.

The estimating of the short-term ego-motion information of the one or more sensors may include: estimating, using an ego-motion model, short-term ego-motion information between the current frame and a short-term reference frame in response to receiving a current frame image of the current frame; and estimating the short-term ego-motion information of the one or more sensors based on the estimated short-term ego-motion information between the current frame and the short-term reference frame.

The estimating of the long-term ego-motion information of the one or more sensors may include: estimating, using an ego-motion model, long-term ego-motion information between the current frame and a long-term reference frame in response to receiving a current frame image of the current frame; and estimating the long-term ego-motion information of the one or more sensors based on the estimated long-term ego-motion information between the current frame and the long-term reference frame.

The estimating of the short-term ego-motion information may include estimating, using a short-term ego-motion model, the short-term ego-motion information from a consecutive frame image pair among the frame images, the estimating of the long-term ego-motion information may include estimating, using a long-term ego-motion model, the long-term ego-motion information from a target frame image of the current frame and a reference frame image among the frame images, and the short-term ego-motion model may have a different configuration from the long-term ego-motion model at least with respect to having respective different trained parameters.

The determining of the attention information may include: extracting, using an attention model, the attention information from the short-term ego-motion information and the long-term ego-motion information.

The extracting of the attention information may include: extracting an attention element from the short-term ego-motion information and the long-term ego-motion information; extracting an attention weight from the short-term ego-motion information; and generating the attention information based on the attention element and the attention weight.

The method may include determining the short-term ego-motion information to be final short-term ego-motion information in response to a number of frame images collected from an initial frame to a current frame being less than a determined frame number.

The method may include: extracting, using an ego-motion model, a short-term ego-motion feature of the one or more sensors from a current frame image of the current frame and a frame image previous to the current frame image among the frame images; generating, using an image deformation model, a restored frame image of the current frame by deforming the previous frame image based on the short-term ego-motion feature; calculating, using the ego-motion model, correction information from the current frame image and the restored frame image; and generating image-based short-term ego-motion information by applying the correction information to short-term ego-motion information of the current frame.

The correction information may correspond to a fine pose error between the restored frame image and the current frame image.

The method may include determining final short-term ego-motion information based on attention-based short-term ego-motion information calculated from the final long-term ego-motion information and the image-based short-term ego-motion information.

The method may include: extracting, using an ego-motion model, a short-term ego-motion feature of the one or more sensors from a current frame image of the current frame and a frame image previous to the current frame image among the frame images; generating a depth image of a frame previous to the current frame from the previous frame image; generating a depth image corresponding to the current frame by deforming the depth image of the previous frame based on the short-term ego-motion feature; converting the depth image corresponding to the current frame into a restored frame image; calculating, using the ego-motion model, correction information from the current frame image and the restored frame image; and generating depth-based short-term ego-motion information by applying the correction information to short-term ego-motion information of the current frame.

The method may include determining final short-term ego-motion information based on attention-based short-term ego-motion information calculated from the final long-term ego-motion information and the depth-based short-term ego-motion information.

The method may include: tracking a travel path of a device in which the one or more sensors are mounted, based on at least one of the final long-term ego-motion information and final short-term ego-motion information calculated from the final long-term ego-motion information; and outputting the tracked travel path of the device.

The method may include: generating, using a depth model, temporary depth information of a frame previous to the current frame from training images; generating, using an ego-motion model and an attention model, temporary long-term ego-motion information from the training images; calculating temporary short-term ego-motion information from the temporary long-term ego-motion information; generating a warped image of a current frame based on the temporary short-term ego-motion information and the temporary depth information of the previous frame; and training any one or any combination of any two or more of the ego-motion model, the attention model, and the depth model based on a loss calculated from the warped image and a current frame image among the training images.

The generating of the warped image may include: generating a three-dimensional (3D) coordinate image corresponding to the previous frame from the temporary depth information; restoring a 3D coordinate image corresponding to a current frame by converting the 3D coordinate image corresponding to the previous frame using the temporary short-term ego-motion information calculated from the temporary long-term ego-motion information; and generating the warped image by projecting the 3D coordinate image corresponding to the current frame two-dimensionally such that the warped image is two dimensionally warped.

A non-transitory computer-readable storage medium may store instructions that, when executed by one or more processors, cause the one or more processors to perform the method.

In another general aspect, a processor-implemented method includes: extracting, using an ego-motion model, a short-term ego-motion feature from a current frame image and a previous frame image; generating, using a deformation model, a restored frame image corresponding to a current frame from at least one image between the previous frame image and a depth image generated from the previous frame image, based on the extracted short-term ego-motion feature; calculating correction information from the restored frame image and the current frame image; and calculating, using the ego-motion model, final short-term ego-motion information by applying the correction information to short-term ego-motion information of the current frame estimated.

In another general aspect, an apparatus may include: one or more sensors configured to acquire frame images of consecutive frames; and one or more processors configured to estimate short-term ego-motion information of the one or more sensors, estimate long-term ego-motion information of the one or more sensors from the frame images, calculate attention information from the short-term ego-motion information and the long-term ego-motion information, and determine final long-term ego-motion information of a current frame by correcting the long-term ego-motion information based on the attention information.

The one or more sensors may include one or more image sensors, and the one or more processors may be configured to determine a travel path of the one or more image sensors based on the determined final long-term ego-motion information.

In another general aspect, a processor-implemented method includes: estimating short-term ego-motion information of a device based on consecutive frame images comprising a current frame image through a set number of previous frame images from the current frame image; estimating long-term ego-motion information of the device based on the current frame image and a previous frame image that is the set number of frame images from the current frame image; determining attention information based on the short-term ego-motion information and the long-term ego-motion information; and determining final long-term ego-motion information of the device by correcting the long-term ego-motion information based on the attention information.

Other features and aspects will be apparent from the following detailed description, the drawings, and the claims.

Figure 1:
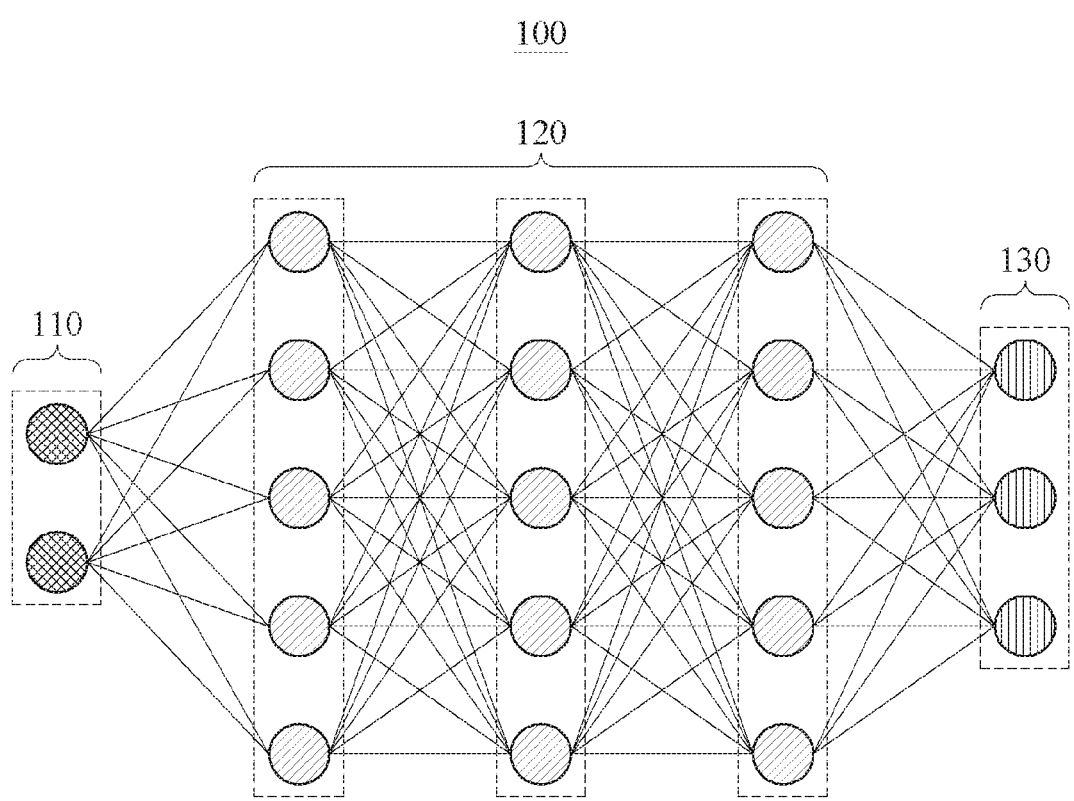
FIG. 1 illustrates an example of an ego-motion model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 illustrates an example of an ego-motion model.

As used herein, a "model" may refer to a computational model practically performed by any one, or any combination of processors set forth in this disclosure. An ego-motion information estimating apparatus may estimate ego-motion information from an input image based on an ego-motion model and an attention model. The input image may include frame images corresponding to a plurality of frames. A frame may refer to a unit frame for dividing time. An individual frame image of the input image may be a color image. Each pixel of the color image may represent a color value. A type of the frame image is not limited to the color image and thus, an image having another format may also be used.

The ego-motion information may be information associated with an ego motion of a sensor, and may indicate an ego-motion variation of the sensor from a reference frame to a target frame. For example, the ego-motion information may include a rotation variation and a translation variation of the sensor from the reference frame to the target frame. In other words, the ego-motion information may indicate a degree of rotation and a degree of translation of the sensor in the target frame based on a pose and a position of the sensor in the reference frame. When the sensor is mounted on a predetermined device (for example, a vehicle and a head mounted display (HMD)), the ego-motion information may indicate an ego-motion variation of the device. Hereinafter, the ego-motion information may be described as information associated with the sensor, but embodiments are not limited thereto. Instead of the ego-motion information of the sensor, ego-motion information may additionally or alternatively be of the device on which the sensor is mounted.

The ego-motion information may include long-term ego-motion information and short-term ego-motion information. The long-term ego-motion information may indicate an ego-motion variation of the sensor between a current frame (for example, a $k^{th}$ frame) and a long-term reference frame (for example, a $(k-n)^{th}$ frame). Here, n is an integer greater than or equal to 1 and k is an integer greater than or equal to n. An example in which k is less than n will be described later on below in this disclosure. The short-term ego-motion information may indicate an ego-motion variation of the sensor between the current frame (for example, the $k^{th}$ frame) and a short-term reference frame (for example, a $(k-1)^{th}$ frame). However, the short-term reference frame of the short-term ego-motion information is not limited to a previous frame (for example, the $(k-1)^{th}$ frame). A number of frames between the short-term reference frame and the current frame may be less than n which is a number of frames between the long-term reference frame and the current frame. Hereinafter, the long-term ego-motion information is also referred to as long-term motion information and the short-term ego-motion information is also referred to as short-term motion information.

The target frame is a frame corresponding to a target of ego-motion information estimation. In the following descriptions, the target frame may be a current frame corresponding to a current point in time. The reference frame is a frame corresponding to a reference of the target frame, and may be a frame temporally previous to the target frame.

The ego-motion model may be used for estimating initial ego-motion information corresponding to the target frame from frame images of various frame intervals in the input image. The frame intervals include, for example, a long-term frame interval and a short-term frame interval. The ego-motion model may be trained, for example, to extract feature data from frame images and output initial ego-motion information from the extracted feature data. The feature data may be data obtained by abstracting an image, for example, and may be represented in a form of a vector or other multi-dimensional forms, for example. The feature data may be data extracted through convolution filtering performed based on one or more convolution layers of a neural network 100 as described below with reference to FIG. 1.

The attention model is a model used for estimating attention information (for example, attention information from the initial ego-motion information estimated based on the ego-motion model). The attention information may be information for indicating or emphasizing data to be attended for a predetermined purpose among data extracted through a layer. In this disclosure, for example, the attention information may be information extracted to correct the long-term ego-motion information among the feature data extracted from the initial ego-motion information. The attention model may also include a structure corresponding to the neural network 100 described with reference to FIG. 1. In the attention model, such convolution filtering may be excluded. An example of extracting attention information using an attention model will be described in detail with reference to FIG. 5.

The ego-motion model and the attention model may each be based on, for example, a machine-learning structure and include respective neural networks 100.

Thus, the neural network 100 is representative of various deep neural network (DNN) embodiments. The DNN may include a fully connected network, a deep convolutional network, and a recurrent neural network. The neural network 100 may perform object classification, object recognition, speech recognition, and/or image recognition by mapping input data and output data having a non-linear relationship to each other based on deep learning. Deep learning is a machine learning technique and may be used to perform image or speech recognition from a big dataset, and may map the input data and the output data through supervised or unsupervised learning.

Referring to FIG. 1, the neural network 100 may include an input layer 110, a hidden layer 120, and an output layer 130. The input layer 110, the hidden layer 120, and the output layer 130 may each include a plurality of artificial nodes.

For ease of description, FIG. 1 illustrates three hidden layers 120. However, the hidden layer 120 may include various numbers of layers, such as four or more hidden layers 120. Further, FIG. 1 illustrates the neural network 100 including a separate input layer to receive input data. However, in another example, the input data may be input directly into the hidden layers 120 (for example, into a first layer of the hidden layers 120). In the neural network 100, nodes of layers excluding the output layer 130 are connected to nodes of a subsequent layer through links to transmit output signals. The number of links may correspond to the number of nodes included in the subsequent layer.

Activation function outputs of artificial nodes of a previous hidden layer 120, related to weighted inputs of the artificial nodes of the previous hidden layer 120, may each be respectively input into artificial nodes of the subsequent-current hidden layer 120, where these input activation outputs from the artificial nodes of the previous hidden layer 120 may be weighted by the respective artificial nodes of the previous hidden layer 120 or prior to the artificial nodes of the previous hidden layer 120, e.g., as respective weighted connections or links between a still further previous hidden layer 120 or the input layer 110 and the previous hidden layer 120. Thus, weighted results may be obtained by, for each of the artificial nodes of the previous hidden layer 120, multiplying each of the corresponding inputs (from the further previous hidden layer 120 or the input layer 110) of an artificial node by a corresponding weight. These weights are referred to as parameters of the neural network 100, e.g., trained parameters of the neural network 100 dependent on the trained objective of the neural network 100. The respectively implemented activation functions may include any one or any combination of a sigmoid, a hyperbolic tangent (tanh), and a rectified linear unit (ReLU), e.g., so a non-linearity is formed in the neural network 100 by the activation function. Thus, in an example, weighted inputs of the artificial nodes included in the previous hidden layer 120— are input into an artificial node of the current hidden layer 120, with such respectively weighted inputs of the artificial nodes included in the previous hidden layer 120 being respectively input to each of multiple or all of the artificial nodes of the current hidden layer 120. In the example of FIG. 1, when the current hidden layer 120 is the final hierarchical hidden layer 120 the activation results of the respective artificial nodes of the final hidden layer 120 are similarly respectively weighted for each connection between the artificial nodes of the final hidden layer 120 and each of the artificial nodes of the output layer 130. Here, the numerous weights or parameters of the neural network 120 may be individualized for each connection or link between artificial nodes of the hidden layers and the output layer, for example, such as where the numerous weights or parameters have been preset or predetermined through particular training of the neural network 100 for a particular objective, as further discussed below.

Accordingly, the ego-motion information estimating apparatus may input outputs of previous hidden nodes included in a previous hidden layer into each subsequent hidden layer (for example, through edges having such weighted connections or 'connection weights') and generate outputs of hidden nodes included in a hidden layer based on values obtained by applying the respective connection weights to the outputs of the previous hidden nodes and corresponding activation functions of the respective nodes. In a neural processor (NPU) example, such output activations may be in the form of an electrical pulse or spike or particularly timed pulse or spike or series of pulses or spikes, where each hidden node may be configured to fire or produce an output pulse or spike to be carried along an electrical connection to the next hidden node of a subsequent hidden layer or output layer (and/or other connection to itself or another layer). For example, each hidden node may be configured to propagate a result of a corresponding activation function when the result exceeds a set threshold of the current hidden node, e.g., where the set threshold may be dependent on the input activations from various hidden nodes of the previous hidden layer to a current hidden node and trained connection weights of the respective connections from such various hidden nodes of the previous layer to the current hidden node. In this example, a node may also be considered as maintaining a deactivated state without firing or propagating a signal to a next node until a predetermined threshold strength of activation is reached through input vectors, e.g., input feature vectors produced as activations from one or more previous layers and/or other layer, or as produced by itself in a previous time. The ego-motion model and the attention model may also be connected, e.g., through an output edge of the ego-motion model and an input edge of the attention model. A connection between an ego-motion model and an attention model will be described with reference to FIG. 5.

In an example, the ego-motion model may include at least one convolution layer as one or more of the hidden layers 120. The ego-motion information estimating apparatus may perform the convolution filtering on frame images input to the ego-motion model based on the convolution layer(s) of the ego-motion model. The ego-motion information estimating apparatus may perform the convolution filtering by applying a convolution operation between a kernel mask and a frame image. A shape, a size, and a structure of the kernel mask may vary based on the training performed to correspondingly produce the trained ego-motion model, noting that examples exist with various shapes, sizes, and structures of the kernel mask. The ego-motion information estimating apparatus may perform the convolution filtering using the ego-motion model to thereby extract the feature data from the frame images. Thereafter, the ego-motion information estimating apparatus may sequentially propagate the extracted feature data through remaining layers of the ego-motion model and ultimately generate the initial ego-motion information (for example, the long-term ego-motion information and the short-term ego-motion information) in the output layer 130 of the ego-motion model.

When the width and the depth of the neural network 100 are sufficiently great, the neural network 100 has a capacity sufficient to implement a predetermined function. The neural network 100 may implement, for example, a function of outputting ego-motion information of the sensor from frame images captured by the sensor. When an in-training neural network having the architecture of neural network 100, for example, learns a sufficient quantity of training data through an appropriate training process, the resultant trained neural network 100 may achieve an optimal estimation performance, e.g., the training may include adjustments of parameters of the in-training neural network until accuracy and/or inaccuracy meets predetermined optimum performances. For reference, an ego-motion model and an attention model may be trained using an unsupervised scheme, and related description will be made with reference to FIGS. 6 and 7. Also, herein, it is noted that use of the term 'may' with respect to an example or embodiment, e.g., as to what an example or embodiment may include or implement or how an example or embodiment may be configured, means that at least one example or embodiment exists where such a feature is included, implemented, and/or configured while all examples and embodiments are not limited thereto.

Figure 2:
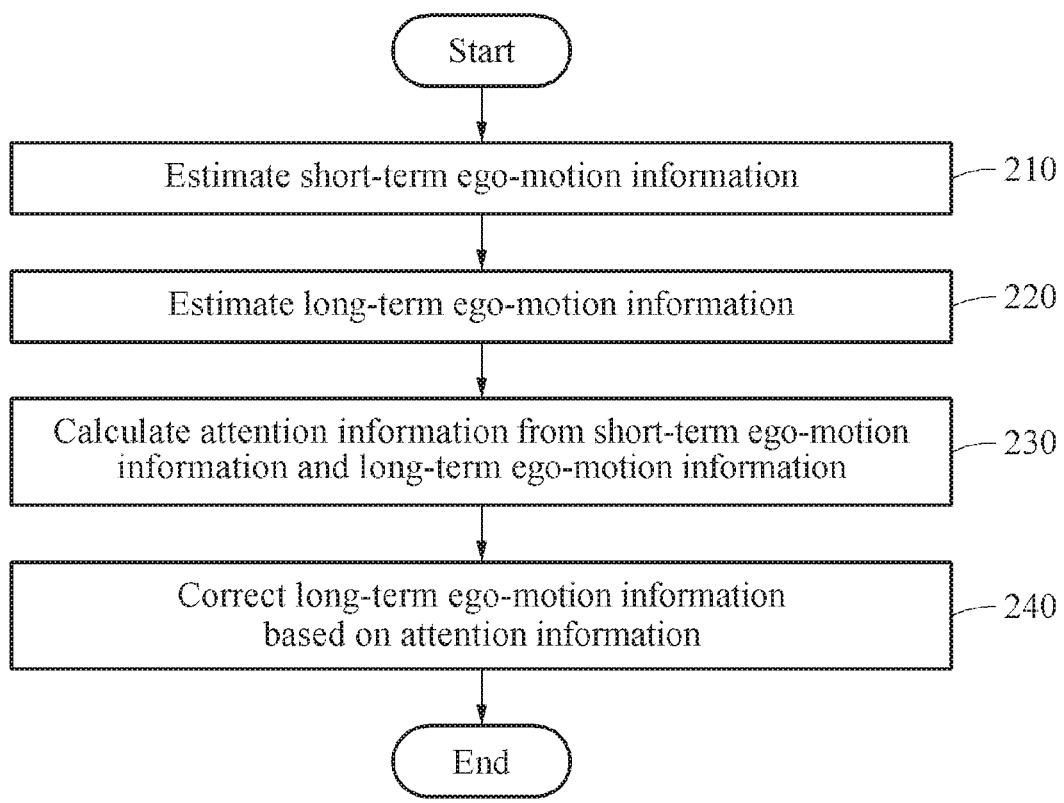
FIG. 2 illustrates an example of a method of estimating ego-motion information.
Figure 3:
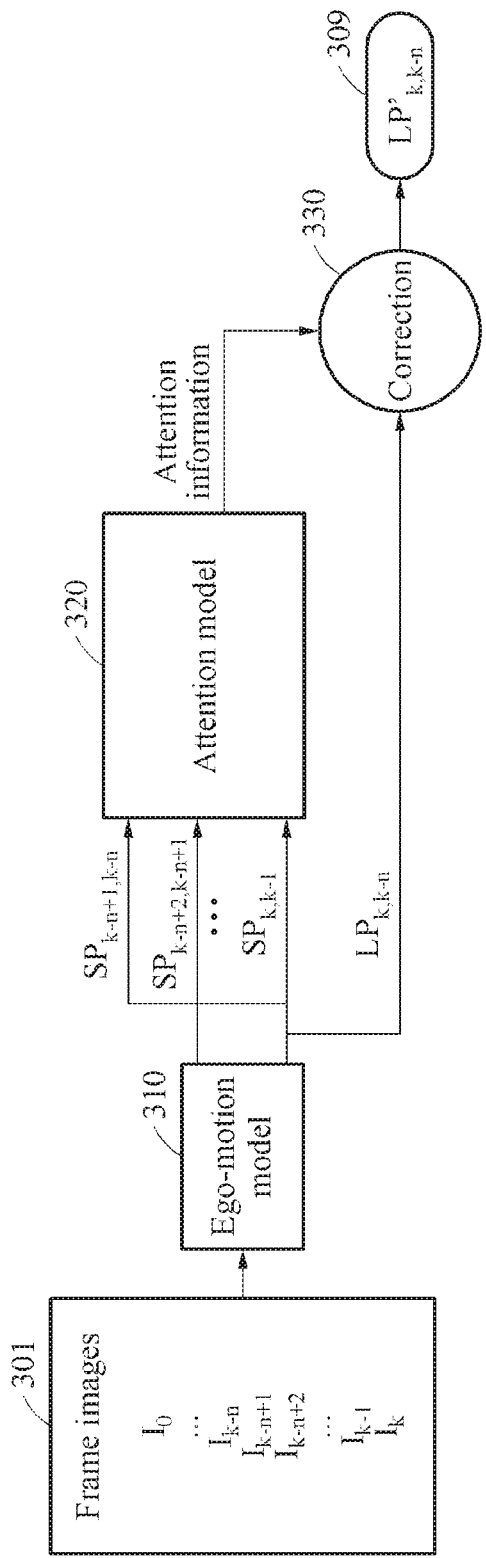
FIG. 3 illustrates an example of a process of estimating ego-motion information.

FIG. 2 illustrates an example of a method of estimating ego-motion information. FIG. 3 illustrates an example of a process of estimating ego-motion information.

FIGS. 2 and 3 illustrate operations of an ego-motion information estimating apparatus estimating ego-motion information corresponding to a current frame, for example, a $k^{th}$ frame.

The ego-motion information estimating apparatus acquires a frame image of the current frame. When a sensor is mounted to face a front view of a vehicle, the sensor may generate a frame image including a scene corresponding to a front field of view of the vehicle. In an example of FIG. 3, frame images 301 include a zeroth frame image $I_0$ through a $k^{th}$ frame image $I_k$ of the current frame. Here, a case in which n is an integer greater than or equal to 1 and k is an integer greater than n (k>n) is described. A case in which k is less than or equal to n will be described later.

For reference, up to the $k^{th}$ frame, the ego-motion information estimating apparatus may accumulate the frame images 301 corresponding to frames before the $k^{th}$ frame, for example, the zeroth frame through the $(k-1)^{th}$ frame. As an example, the ego-motion information estimating apparatus may accumulate the frame images 301 (for example, the $(k-n)^{th}$ frame through the $k^{th}$ frame) corresponding to the $k^{th}$ frame and n frames before the $k^{th}$ frame.

In operation 210, the ego-motion information estimating apparatus estimates short-term ego-motion information. The ego-motion information estimating apparatus may estimate short-term ego-motion information of a sensor having acquired the frame images 301 of consecutive frames, from the frame images 301. For example, the ego-motion information estimating apparatus may estimate the short-term ego-motion information from the frame images 301 based on an ego-motion model 310. The ego-motion information estimating apparatus estimates an ego-motion variation of the sensor from a short-term reference frame to the current frame. The ego-motion information estimating apparatus estimates the short-term ego-motion information from a frame image corresponding to the short-term reference frame and a frame image corresponding to the current frame based on the ego-motion model 310. For example, the ego-motion information estimating apparatus may estimate initial short-term ego-motion information $SP_{k,k-1}$ corresponding to the current frame, based on the ego-motion model 310, from the frame images 301 corresponding to the $k^{th}$ frame as the current frame and the $(k-1)^{th}$ frame as a previous frame of the current frame.

The ego-motion information estimating apparatus may accumulate initial short-term ego-motion information estimated up to the previous frame. For example, the ego-motion information estimating apparatus may accumulate short-term ego-motion information $SP_{k-n+1,k-n}$, corresponding to a $(k-n+1)^{th}$ frame and short-term ego-motion information $SP_{k-n+2,k-n+1}$ corresponding to a $(k-n+2)^{th}$ frame through short-term ego-motion information $SP_{k-1,k-2}$ corresponding to the $(k-1)^{th}$ frame, and stores the accumulated information. $SP_{i,j}$ is short-term ego-motion information corresponding to an $i^{th}$ frame and indicates a short-term ego-motion variation from a $j^{th}$ frame to the $i^{th}$ frame. Here, i and j are integers greater than or equal to 0, and i is greater than j.

In operation 220, the ego-motion information estimating apparatus estimates long-term ego-motion information. The ego-motion information estimating apparatus may estimate long-term ego-motion information of the sensor from the frame images 301. For example, the ego-motion information estimating apparatus may estimate the short-term ego-motion information from the frame images 301 based on the ego-motion model 310, and the ego-motion information estimating apparatus may estimate an ego-motion variation of the sensor from a long-term reference frame to the current frame. The ego-motion information estimating apparatus may estimate the long-term ego-motion information, based on the ego-motion model 310, from a frame image corresponding to the long-term reference frame and a frame image corresponding to the current frame. For example, the ego-motion information estimating apparatus estimates initial long-term ego-motion information $LP_{k,k-n}$ corresponding to the current frame, based on the ego-motion model 310, from the frame images 301 corresponding to the $k^{th}$ frame and the $(k-n)^{th}$ frame as the long-term reference frame. $LP_{i,j}$ is long-term ego-motion information corresponding to the $i^{th}$ frame and indicates a long-term ego-motion variation from the $j^{th}$ frame to the $i^{th}$ frame.

Although a structure in which the ego-motion model 310 is configured to output ego-motion information corresponding to the target frame (for example, the current frame from two frame images 301) is described with reference to operations 210 and 220, embodiments are not limited thereto. Depending on an example, the ego-motion model 310 may be configured to output ego-motion information corresponding to the target frame from a plurality of frame images 301.

In operation 230, the ego-motion information estimating apparatus calculates attention information from the short-term ego-motion information and the long-term ego-motion information. For example, the ego-motion information estimating apparatus may calculate the attention information based on an attention model 320 from the short-term ego-motion information and the long-term ego-motion information.

In operation 240, the ego-motion information estimating apparatus corrects the long-term ego-motion information based on the attention information. The ego-motion information estimating apparatus applies the attention information to the long-term ego-motion information, thereby determining final long-term ego-motion information LP'$_{k,k-n}$ 309 of the current frame. A correction 330 is an operation of applying the attention information to initial long-term ego-motion information LP$_{k,k-n}$ corresponding to the current frame. For example, when the initial long-term ego-motion information LP$_{k,k-n}$ and the attention information is calculated to be the same dimensional matrix data, the correction 330 may be an operation of applying the attention information to the initial long-term ego-motion information LP$_{k,k-n}$ through a matrix product calculation or an add operation. However, the correction 330 is not limited thereto. The correction 330 may vary based on data types of the initial long-term ego-motion information LP$_{k,k-n}$ and the attention information. Through the correction 330, the ego-motion information estimating apparatus may determine a final ego-motion variation of the sensor from the long-term reference frame to the current frame. Here, a frame before n frames from the current frame may be determined as the long-term reference frame, n being a predetermined number of frames and an integer greater than or equal to 1.

Thereafter, the ego-motion information estimating apparatus may determine final short-term ego-motion information of the current frame based on the determined final long-term ego-motion information 309. The ego-motion information estimating apparatus may determine the final short-term ego-motion information SP'$_{k,k-1}$ of the current frame based on final long-term ego-motion information LP'$_{k-1,k-n-1}$ determined in the previous frame, the final short-term ego-motion information SP'$_{k-n,k-n-1}$ corresponding to the long-term reference frame (for example, the (k−n)$^{th}$ frame), and the final long-term ego-motion information LP'$_{k,k-n}$ 309 of the current frame. For example, the final short-term ego-motion information SP'$_{k,k-1}$ may be expressed as shown in Equation 3.

$$P = \begin{bmatrix} [R(3 \times 3)] & [T(3 \times 1)] \\ 0 \ 0 \ 0 & 1 \end{bmatrix} \quad \text{Equation 1}$$

$$P_{k,k-n} = P_{k-n+1,k-n} P_{k-n+2,k-n+1} \cdots P_{k-2,k-3} P_{k-1,k-2} P_{k,k-1} \quad \text{Equation 2}$$
$$= (P_{k-1,k-n}) P_{k,k-1}$$

$$SP'_{k,k-1} = P_{k,k-1} = (P_{k-1,k-n})^{-1} P_{k,k-n} \quad \text{Equation 3}$$
$$= \{(P_{k-n,k-n-1})^{-1} P_{k-1,k-n-1}\}^{-1} P_{k,k-n}$$
$$= \{(SP'_{k-n,k-n-1})^{-1} LP'_{k-1,k-n-1}\}^{-1} LP'_{k,k-n}$$

Equation 1 may represent a data format of predetermined ego-motion information. For example, R(3×3) is a (3×3)-dimensional matrix and may denote a rotation variation of the sensor for three axes in a three-dimensional (3D) space. Also, T(3×1) is a (3×1)-dimensional matrix and may denote a translation variation. Thus, ego-motion information may be expressed by an ego-motion matrix, for example, a matrix of an SE3 format including a rotation matrix and a translation matrix. In the following description, ego-motion information is explained as a matrix for ease of description and calculation and other types of data may also be used.

Equation 2 may represent ego-motion information P$_{k,k-n}$ from the (k−n)$^{th}$ frame and the k$^{th}$ frame. According to Equation 2, an ego-motion matrix corresponding to a previous frame is merged with an ego-motion matrix corresponding to a frame subsequent to the previous frame by applying the ego-motion matrix corresponding to the subsequent frame through a matrix product calculation. Accordingly, as shown in Equation 2, ego-motion information P$_{k,k-n}$ from the (k−n)$^{th}$ frame to the k$^{th}$ frame may be expressed by a matrix product of ego-motion information P$_{k-1,k-n}$ from the (k−n)$^{th}$ frame to the (k−1)$^{th}$ frame and ego-motion information P$_{k,k-1}$ from the (k−1)$^{th}$ frame to the k$^{th}$ frame.

When both sides of Equation 2 are multiplied by an inverse matrix of the ego-motion information P$_{k-1,k-n}$, the final short-term ego-motion information SP'$_{k,k-1}$ from the (k−1)$^{th}$ frame to the k$^{th}$ frame may be calculated as shown in Equation 3. The ego-motion information estimating apparatus has calculated the final short-term ego-motion information SP'$_{k-n,k-n-1}$ corresponding to the (k−n)$^{th}$ frame in the (k−1)$^{th}$ frame which is a previous frame, the final long-term ego-motion information LP'$_{k-1,k-n-1}$ corresponding to the (k−1)$^{th}$ frame, and the final long-term ego-motion information LP'$_{k,k-n}$ 309 corresponding to the k$^{th}$ frame in operation 240 of the k$^{th}$ frame which is a current frame. Thus, ego-motion information estimating apparatus may calculate final short-term ego-motion information SP'$_{k,k-1}$ of the current frame according to Equation 3.

The case in which k>n has been described. In the following description, a case in which k<n and a case in which k=n are explained. Table 1 represents information calculated in each operation based on k.

TABLE 1

| | (k − 1)$^{th}$ frame | | k$^{th}$ frame | |
| --- | --- | --- | --- | --- |
| Results accumulated up to previous frame | 210 | 220 | 230 & 240 | Final short-term ego-motion information |

TABLE 1-continued

|   | $(k-1)^{th}$ frame | $k^{th}$ frame | | | |
|---|---|---|---|---|---|
| k < n | $SP_{1,0}$<br>...<br>$SP_{k-1,k-2}$ | $SP_{k,k-1}$ | — | — | — |
| k = n | $SP_{1,0}$<br>...<br>$SP_{n-1,n-2}$ | $SP_{n,n-1}$ | $LP_{n,0}$ | $LP'_{n,0}$ | $SP'_{n,n-1} = (P_{n-1,0})^{-1}P_{n,0} = (SP_{1,0} \ldots SP_{n-1,n-2})^{-1}LP'_{n,0}$ |
| k > n | $SP_{1,0}$<br>$SP_{2,1}$<br>...<br>$SP_{k-n,k-n-1}$<br>$SP_{k-n+1,k-n}$<br>...<br>$SP_{k-1,k-2}$<br>$LP'_{k-1,k-1-n}$ | $SP_{k,k-1}$ | $LP_{k,k-n}$ | $LP'_{k,k-n}$ | $SP'_{k,k-1} = (P_{k-1,k-n})^{-1}P_{k,k-n} = \{(SP'_{k-n,k-n-1})^{-1}LP'_{k-1,k-1-n}\}^{-1}LP'_{k,k-n}$ |

In the $k^{th}$ frame, k being greater than n, the final long-term ego-motion information $LP'_{k-1,k-n-1}$ corresponding to the $(k-1)^{th}$ frame is accumulated in the previous frame. In the case in which k=n or k<n, the corresponding information is not calculated.

Thus, in a $k^{th}$ frame, k being less than n, the ego-motion information estimating apparatus determines the short-term ego-motion information $SP_{k,k-1}$ to be the final short-term ego-motion information in response to the number of frame images 301 collected from an initial frame to the current frame being less than n. While k is less than n, the ego-motion information estimating apparatus repetitively estimates the short-term ego-motion information $SP_{k,k-1}$ corresponding to the $k^{th}$ frame in operation 210.

In a $k^{th}$ frame, k being equal to n, the ego-motion information estimating apparatus calculates the final long-term ego-motion information 309, for example, $LP'_{n,0}$ initially corresponding to an $n^{th}$ frame. Since long-term ego-motion information corresponding to an $(n-1)^{th}$ frame is not estimated, the ego-motion information estimating apparatus replace ego-motion information $P_{n-1,0}$ corresponding to a zeroth frame to the $(n-1)^{th}$ frame with a matrix products of short-term ego-motion information $SP_{1,0}, \ldots, SP_{n-1,n-2}$ corresponding to the first frame through the $(n-1)^{th}$ frame. The ego-motion information estimating apparatus calculates final short-term ego-motion information $SP'_{n,n-1}$ corresponding to the $n^{th}$ frame in the $n^{th}$ frame according to Equation 4, for example.

$$SP'_{n,n-1} = (P_{n-1,0})^{-1}P_{n,0} = (SP_{1,0} \ldots SP_{n-1,n-2})^{-1}LP'_{n,0} \quad \text{Equation 4}$$

The ego-motion information estimating apparatus may determine a pose and a position of a device in each frame using either one or both of the final long-term ego-motion information and the final short-term ego-motion information. The position of the device may be a position relative to a reference position, but is not limited thereto. For example, the position of the device may also be an absolute position. The pose of the device may be a pose relative to a reference pose, but is not limited thereto. For example, the pose of the device may also be an absolute pose. The ego-motion information estimating apparatus may set a predetermined geographical position or physical position to be an origin as a reference position, and set a reference pose. The ego-motion information estimating apparatus may determine a pose and a position of the device in each frame by accumulating applications of the final short-term ego-motion information and/or the final long-term ego-motion information to the reference pose and the reference position. For example, the ego-motion information estimating apparatus may determine a pose and a position of the current frame by applying the final short-term ego-motion information determined in the current frame to a pose and a position of the previous frame. Likewise, the ego-motion information estimating apparatus may determine a pose and a position of the subsequent frame by applying the final short-term ego-motion information determined in the subsequent frame to the pose and the position of the current frame. As such, the ego-motion information estimating apparatus may repetitively apply the final short-term ego-motion information determined in the current frame to the pose and the position of the previous frame and accumulate results thereof, thereby tracking the pose and the position determined in each frame. When tracking the pose and the position of the device using only the short-term ego-motion information, an accumulated error may increase in the tracked pose and position by lapse of time. The ego-motion information estimating apparatus of one or more embodiments may minimize the accumulate error by applying the long-term ego-motion information.

Figure 4:
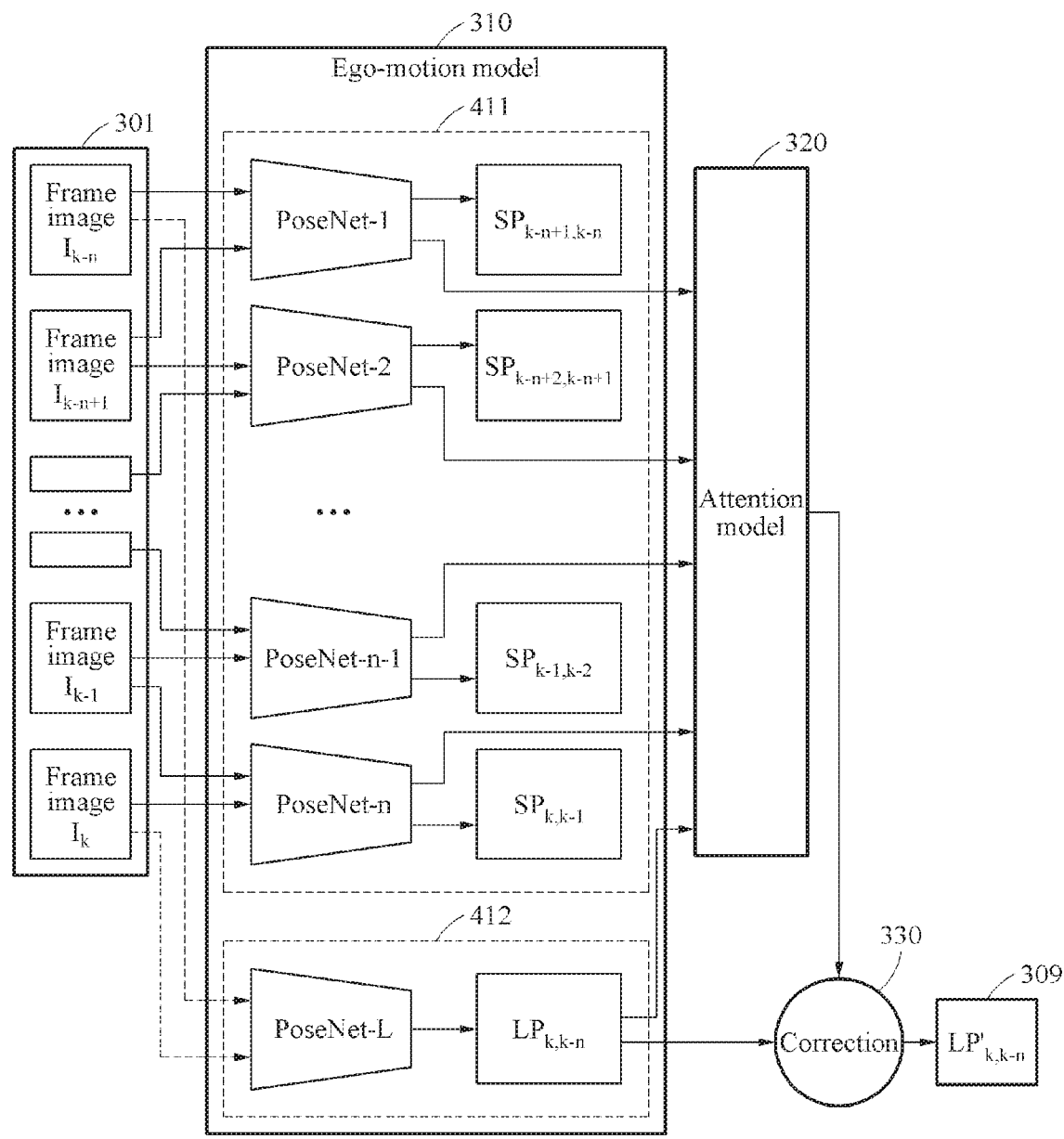
FIG. 4 illustrates an example of an operation for estimating ego-motion information using an ego-motion model.

FIG. 4 illustrates an example of an operation for estimating ego-motion information using an ego-motion model.

An ego-motion information estimating apparatus may calculate short-term ego-motion information (for example, $SP_{k-n+1,k-n}$ through $SP_{k,k-1}$) and long-term ego-motion information (for example, $LP_{k,k-n}$) LP based on an ego-motion model.

In response to a current frame image of a current frame being received, the ego-motion information estimating apparatus may estimate short-term ego-motion information $SP_{k,k-1}$ between the current frame (for example, a $k^{th}$ frame) and a short-term reference frame (for example, a $(k-1)^{th}$ frame) based on the ego-motion model. The ego-motion information estimating apparatus may accumulate short-term ego-motion information calculated for each frame and store the accumulated short-term ego-motion information. The ego-motion information estimating apparatus may archive short-term ego-motion information n frames before the current frame, for example, a $(k-n)^{th}$ frame through the $k^{th}$ frame. The ego-motion information estimating apparatus may archive information associated with the n frames (for example, short-term ego-motion information and long-term ego-motion information) and also remove information associated with frames before the n frames.

In response to the current frame image being received, the ego-motion information estimating apparatus may estimate long-term ego-motion information $LP_{k,k-n}$ between the current frame (for example, the $k^{th}$ frame) and a long-term reference frame (for example, the $(k-n)^{th}$ frame) based on the ego-motion model.

The short-term ego-motion information and the long-term ego-motion information may be estimated based on the same ego-motion model. In such an example, the ego-motion information estimating apparatus may sequentially perform an ego-motion model of a fixed structure and a fixed parameter for each frame to calculate ego-motion information of the corresponding frame from the frame images 301.

However, embodiments are not limited thereto. As shown in FIG. 4, in an example, the ego-motion information estimating apparatus includes n+1 ego-motion models PoseNet-1 through PoseNet-n, and PoseNet-L. Each of the ego-motion models PoseNet-1 through PoseNet-n and PoseNet-L may be used to calculate short-term ego-motion information and long-term ego-motion information corresponding to each frame. In this example, the ego-motion models PoseNet-1 through PoseNet-n and PoseNet-L may include different structures and differently trained parameters (for example, connection weights).

Also, the ego-motion information estimating apparatus may estimate short-term ego-motion information from a consecutive frame image pair among the frame images 301 based on a short-term ego-motion model 411. The consecutive frame image pair may be two frame images temporally separated from each other. The ego-motion information estimating apparatus may estimate long-term ego-motion information from a target frame image and a reference frame image among the frame images 301 based on a long-term ego-motion model 412. A parameter of the short-term ego-motion model 411 may be different from a parameter of the long-term ego-motion model 412.

Figure 5:
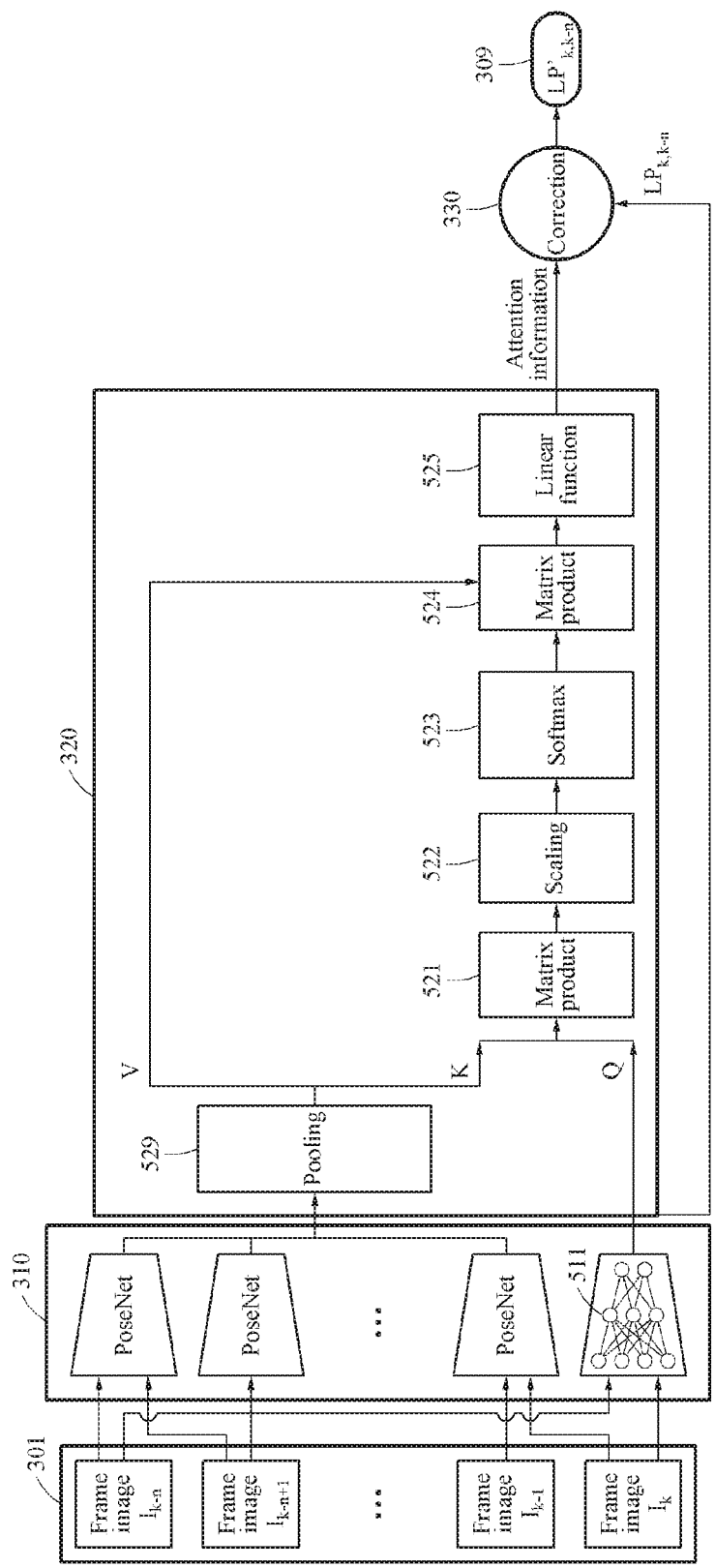
FIG. 5 illustrates an example of an attention operation using an attention model.

FIG. 5 illustrates an example of an attention operation using an attention model.

An ego-motion information estimating apparatus may extract attention information from short-term ego-motion information and long-term ego-motion information based on the attention model 320. For example, the ego-motion information estimating apparatus may extract an attention element from the short-term ego-motion information and the long-term ego-motion information. The attention element may be data wherein a higher weight is assigned to a key that is similar to query data Q corresponding to the long-term ego-motion information among key data K corresponding to the short-term ego-motion information. The ego-motion information estimating apparatus may extract an attention weight from the short-term ego-motion information. The ego-motion information estimating apparatus may generate attention information based on the attention element and an attention weight V. The attention model 320 may include pooling, scaling, and/or a matrix product calculation without convolution filtering.

For example, as shown in FIG. 5, an output of the ego-motion model is connected to an input of the attention model 320. The ego-motion information estimating apparatus may extract the key data K from the short-term ego-motion information output from the ego-motion model based on the attention model 320, extract the query data Q from the long-term ego-motion information, sequentially apply a matrix product calculation 521, a scaling operation 522, and a softmax operation 523, and extract the attention element. The attention element indicates information to be attended in the key data and the query data. The key data K may be data extracted from the short-term ego-motion information through a pooling 529. The query data Q may be data extracted from the long-term ego-motion information. The ego-motion information estimating apparatus may calculate the attention information by applying a matrix product calculation 524 to the attention weight V and the attention element extracted from the short-term ego-motion information through the pooling 529 and apply a linear function 525 to a result thereof. The attention information may be a weighted value that a proportion of information similar to the query data Q increases in the key data K.

Although FIG. 5 illustrates that the ego-motion information is input to the attention model 320, embodiments are not limited thereto. For example, feature data prior to being output as ego-motion information (that is, an ego-motion feature) may be input to the attention model 320.

As described above, the ego-motion information estimating apparatus may determine the final long-term ego-motion information 309 through the correction 330 performed by applying the attention information to the long-term ego-motion information.

For reference, in this disclosure, a model (for example, a neural network) in which a number of nodes of a layer decreases from an input layer toward an output layer (such as the long-term ego-motion model 511 of FIG. 5) is described as an example. However, embodiments are not limited thereto.

Figure 6:
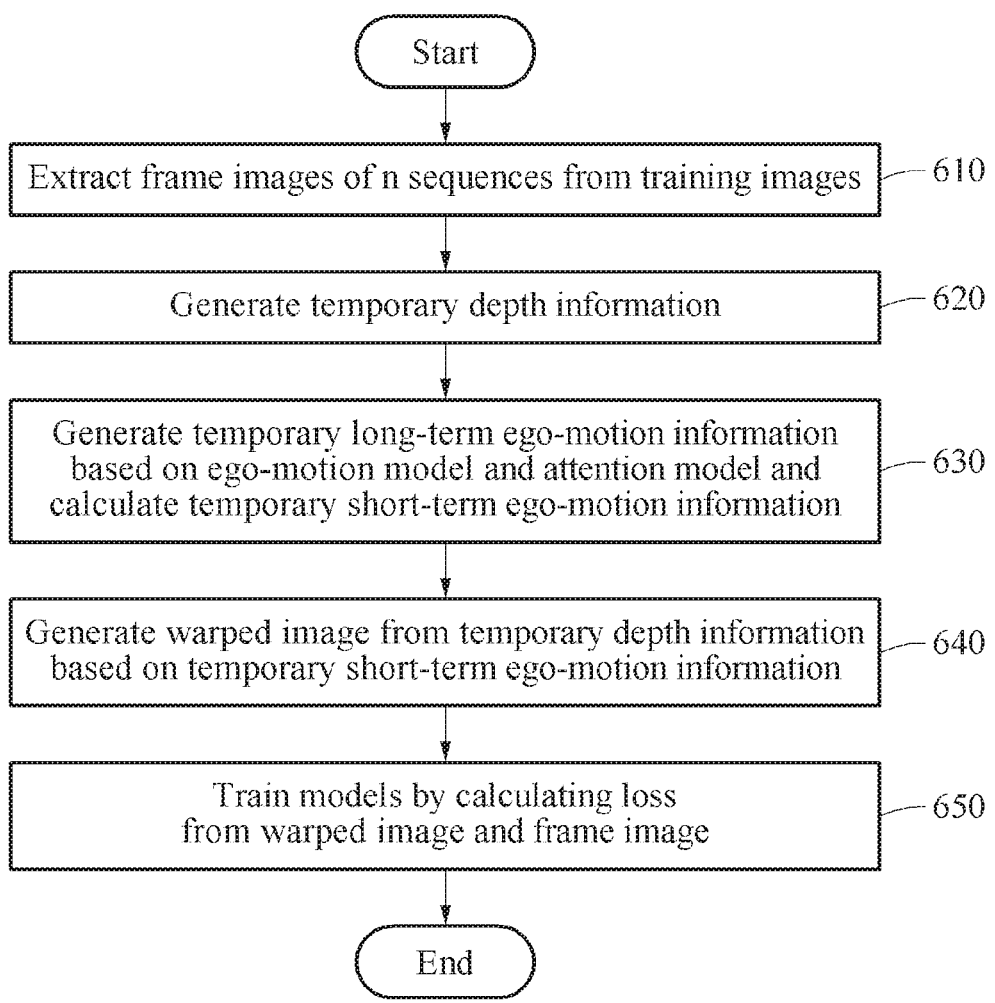
FIG. 6 illustrates an example of a method of training an ego-motion model and an attention model.
Figure 7:
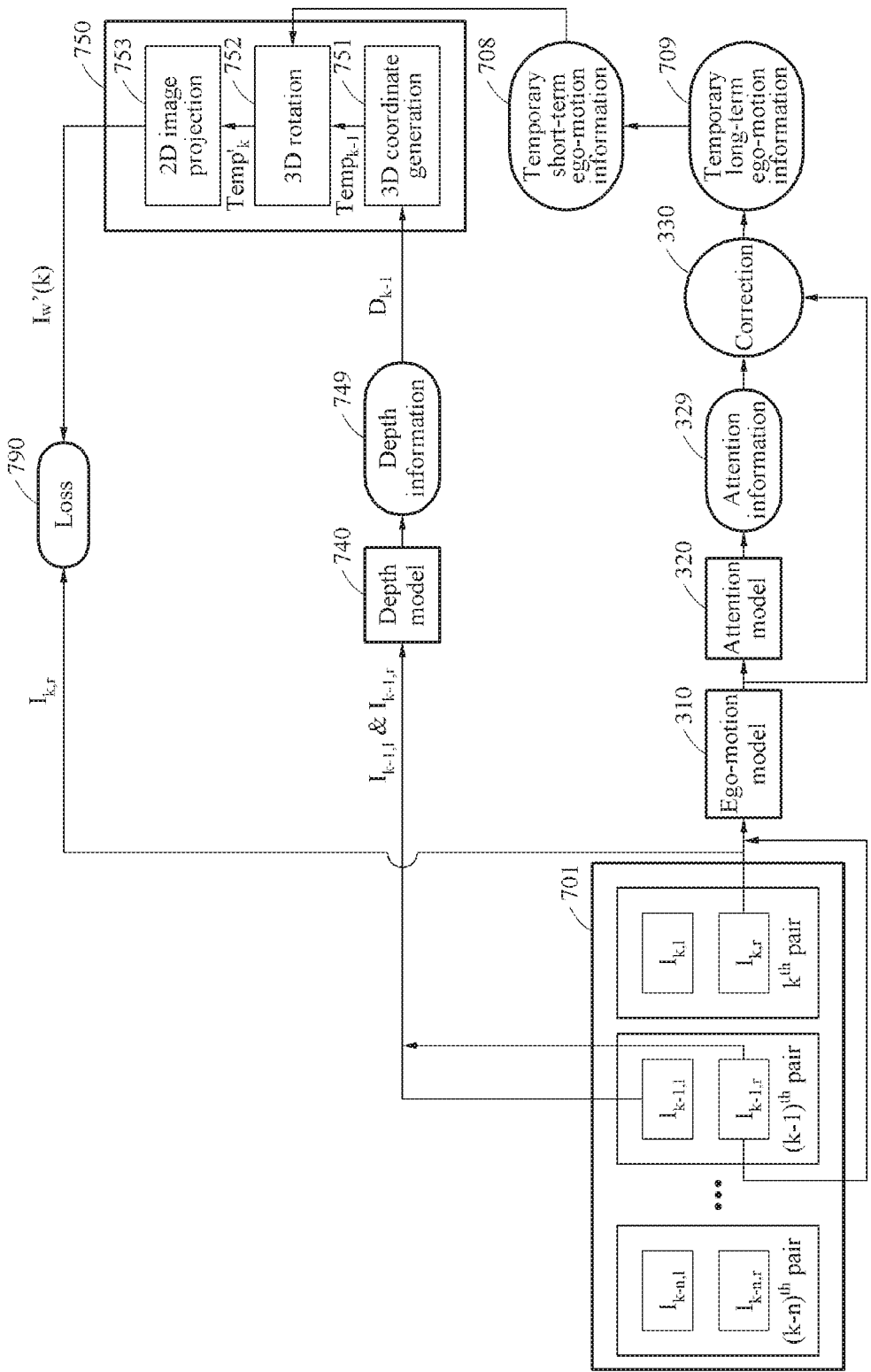
FIG. 7 illustrates an example of a process of training an ego-motion model and an attention model.

FIG. 6 illustrates an example of a method of training an ego-motion model and an attention model. FIG. 7 illustrates an example of a process of training an ego-motion model and an attention model.

In operation 610, an ego-motion information estimating apparatus extracts frame images of n sequences from training images 701. The training images may be images separate from, and may not include, an input image, but are not limited thereto. Since a training is an unsupervised learning method to be performed even when a ground truth for a given image is absent, the input image may be used as a training image.

In operation 620, the ego-motion information estimating apparatus generates temporary depth information 749. The ego-motion information estimating apparatus may generate the temporary depth information 749 of a previous frame from the training images 701 based on a depth model 740. The ego-motion information estimating apparatus may generate the temporary depth information 749 corresponding to a $(k-1)^{th}$ frame from the training images 701 (for example, from $I_{k-1,l}$ and $I_{k-1,r}$ as training stereo images) corresponding to the $(k-1)^{th}$ frame based on the depth model 740. The depth model 740 is a model configured to generate a depth image from a stereo image, for example, two color images.

Depth information may be information associated with depths of points included in a field of view (FOV) of a sensor and may include a depth image. The depth image may be an image that shows distances from the sensor to the points. For example, a pixel value of each pixel in the depth image may be a value of a distance from the sensor to a physical position of a point indicated by the corresponding pixel. The depth image may be an image into which a stereo image (for example, a left image and a right image acquired by a pair of camera sensors) is converted, but is not limited thereto. For example, the depth image may be an image acquired by a depth sensor.

A training stereo image is a stereo image. A first training image $I_{k-1,l}$ corresponding to the $(k-1)^{th}$ frame is a left image, and a second training image $I_{k-1,r}$ is a right image. A left image may be an image acquired by a camera sensor disposed on a left side based on a center of a device (for example, a vehicle between the pair of camera sensors). A right image may be an image acquired by a camera sensor disposed on a right side based on the center of the device. However, the stereo image is not limited to the aforementioned left and right images. The stereo image may be two images acquired by a pair of camera sensors spaced apart from each other.

The depth model 740 may be a model on which a training is completed prior to the training process of FIG. 6, and may be a neural network. However, the depth model 740 is not limited thereto, and the depth model 740 may also be trained during a training process described with reference to FIG. 7.

In operation 630, the ego-motion information estimating apparatus generates temporary long-term ego-motion information 709 based on the ego-motion model 310 and the attention model 320 and calculates temporary short-term ego-motion information 708. The ego-motion information estimating apparatus may generate the temporary long-term ego-motion information 709 from the training images 701 based on the ego-motion model 310 and the attention model 320 and calculate the temporary short-term ego-motion information 708 from the temporary long-term ego-motion information 709. The calculation of the temporary short-term ego-motion information 708 may be as described above with reference to FIGS. 2 through 5.

In operation 640, the ego-motion information estimating apparatus generates a warped image $I_w'(k)$ from the temporary depth information 749 based on the temporary short-term ego-motion information 708. The ego-motion information estimating apparatus may generate the warped image $I_w'(k)$ of a current frame based on the temporary short-term ego-motion information 708 and the temporary depth information 749 of the previous frame.

In operation 640, the ego-motion information estimating apparatus generates the warped image $I_w'(k)$ through a warping 750. The ego-motion information estimating apparatus may generate a 3D coordinate image $Temp_{k-1}$ corresponding to the previous frame from the temporary depth information 749 through a 3D coordinate generation 751. The ego-motion information estimating apparatus may restore the 3D coordinate image $Temp'_k$ corresponding to the current frame by converting the 3D coordinate image $Temp_{k-1}$ corresponding to the previous frame using the temporary short-term ego-motion information 708 calculated from the temporary long-term ego-motion information 709 through a 3D rotation 752. Each of the 3D coordinate images $Temp_{k-1}$ and $Temp'_k$ may be an image that shows an object or a background appearing in an image, for example, a depth image or a color image based on 3D information. A pixel value of each pixel in the 3D coordinate images $Temp_{k-1}$ and $Temp'_k$ may have a 3D coordinate value for which a predetermined reference point is set to be an origin. The ego-motion information estimating apparatus may generate a 2D-warped image $I_w'(k)$ by two-dimensionally projecting the 3D coordinate image $Temp'_k$ corresponding to the current frame through a 2D image projection 753. As such, the warped image $I_w'(k)$ is an image into which an image of the $(k-1)^{th}$ frame is converted into a pose and a position corresponding to the $k^{th}$ frame using information estimated in the previous frame, for example, the $(k-1)^{th}$ frame.

In operation 650, the ego-motion information estimating apparatus trains models by calculating a loss 790 from the warped image $I_w'(k)$ and a frame image. The ego-motion information estimating apparatus may train at least one of the ego-motion model 310, the attention model 320, and the depth model 740 based on a current frame image among the training images 701 and the loss 790 calculated from the warped image $I_w'(k)$. For reference, a pixel value of each pixel in the warped image $I_w'(k)$ and the training images may be a color value.

The ego-motion information estimating apparatus calculates the loss 790 based on the training image $I_{k,r}$ corresponding to the $k^{th}$ frame and the warped image $I_w'(k)$ corresponding to the $k^{th}$ frame. For example, the ego-motion information estimating apparatus may calculate a value L1 as a pixel value difference between the two images. Thus, irrespective of whether a ground truth is given, the ego-motion information estimating apparatus may perform unsupervised learning by calculating the loss 790 from the training image $I_{k,r}$ corresponding to the $k^{th}$ frame and the warped image $I_w'(k)$ corresponding to the $k^{th}$ frame. The ego-motion information estimating apparatus may update parameters of the ego-motion model 310, the attention model 320, and the depth model 740 through backpropagation such that the calculated loss 790 is reduced. The ego-motion information estimating apparatus may repetitively update the parameter of each of the models until the loss 790 converges to a predetermined value. Also, the ego-motion information estimating apparatus may update the parameter of each of the models a predetermined number of times until the loss 790 is reduced until the loss 790 is reduced.

Figure 8:
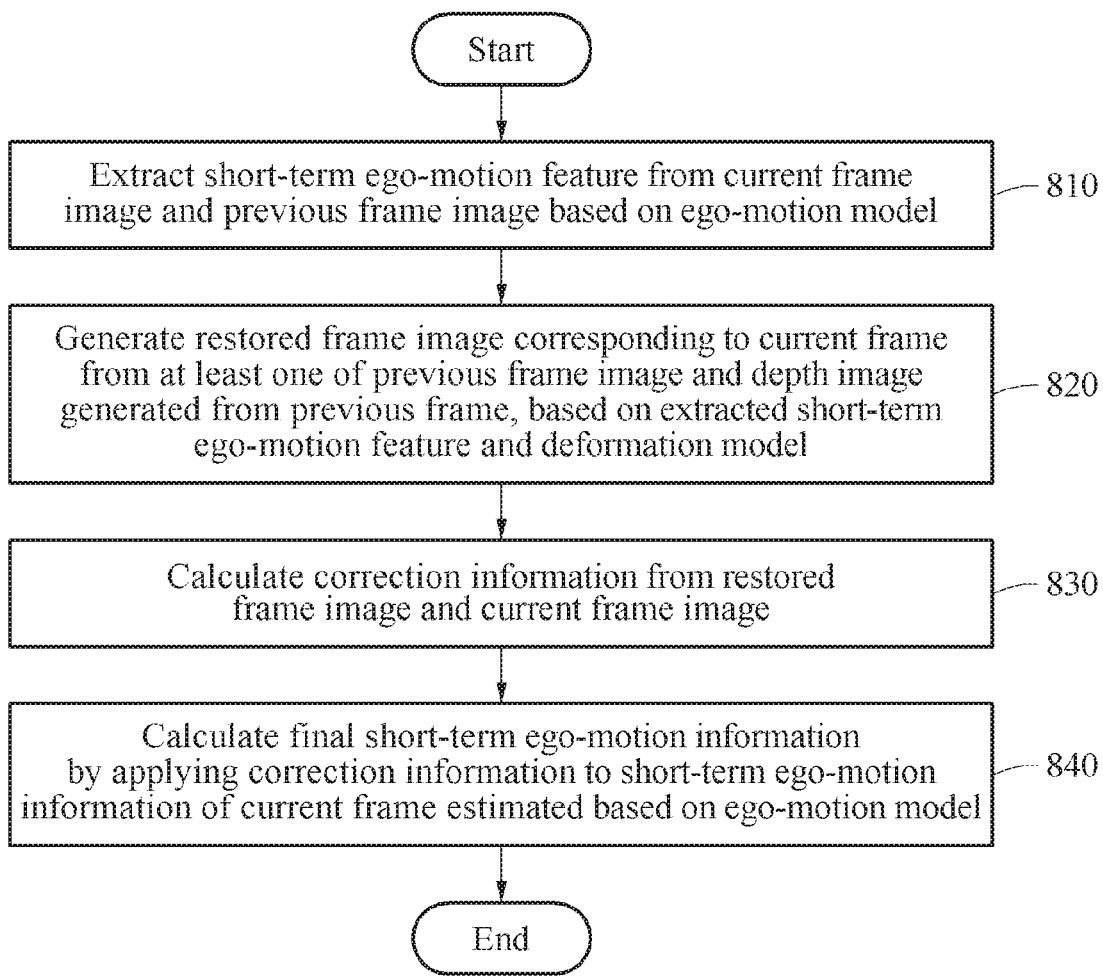
FIG. 8 illustrates an example of a method of estimating ego-motion information.

FIG. 8 illustrates a method of estimating ego-motion information.

In operation 810, an ego-motion information estimating apparatus extracts a short-term ego-motion feature from a current frame image and a previous frame image based on an ego-motion model. The short-term ego-motion feature may be feature data extracted based on the ego-motion model, and may be an output of a layer prior to a layer to output the short-term ego-motion information in the ego-motion model.

Figure 9:
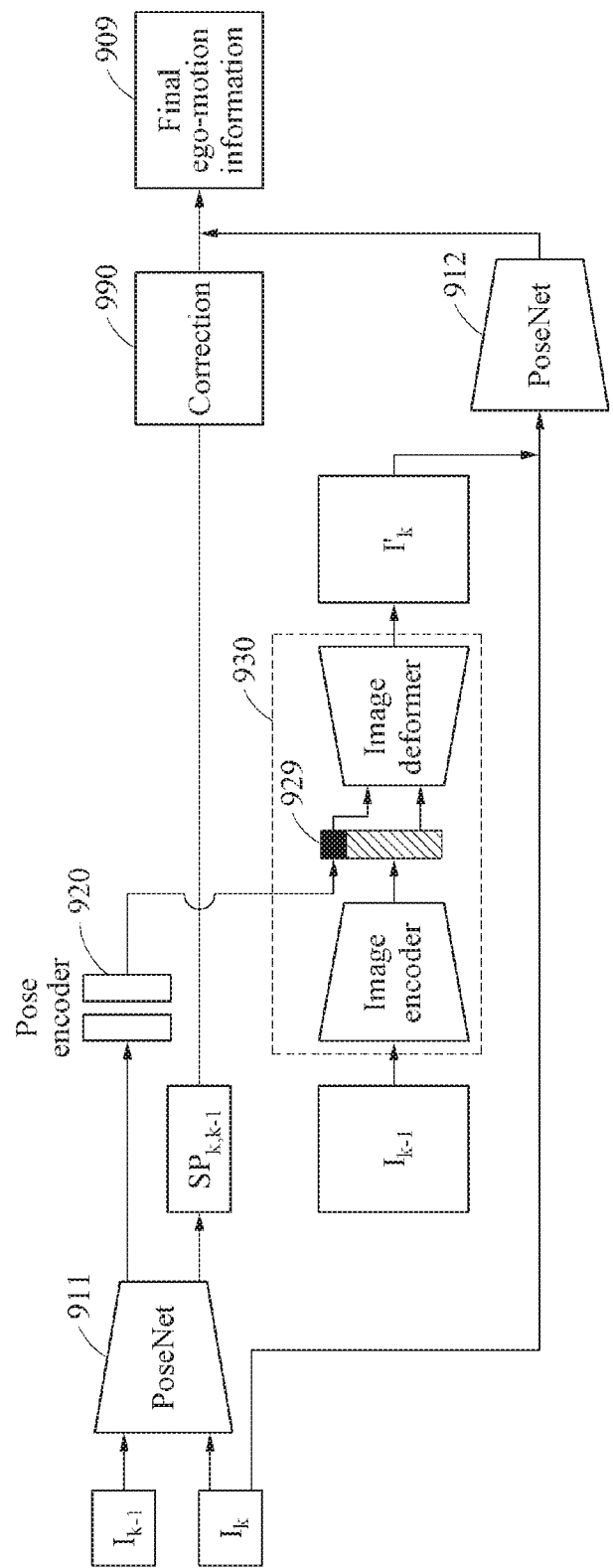
FIGS. 9 and 10 illustrate examples of processes of estimating ego-motion information.
Figure 10:
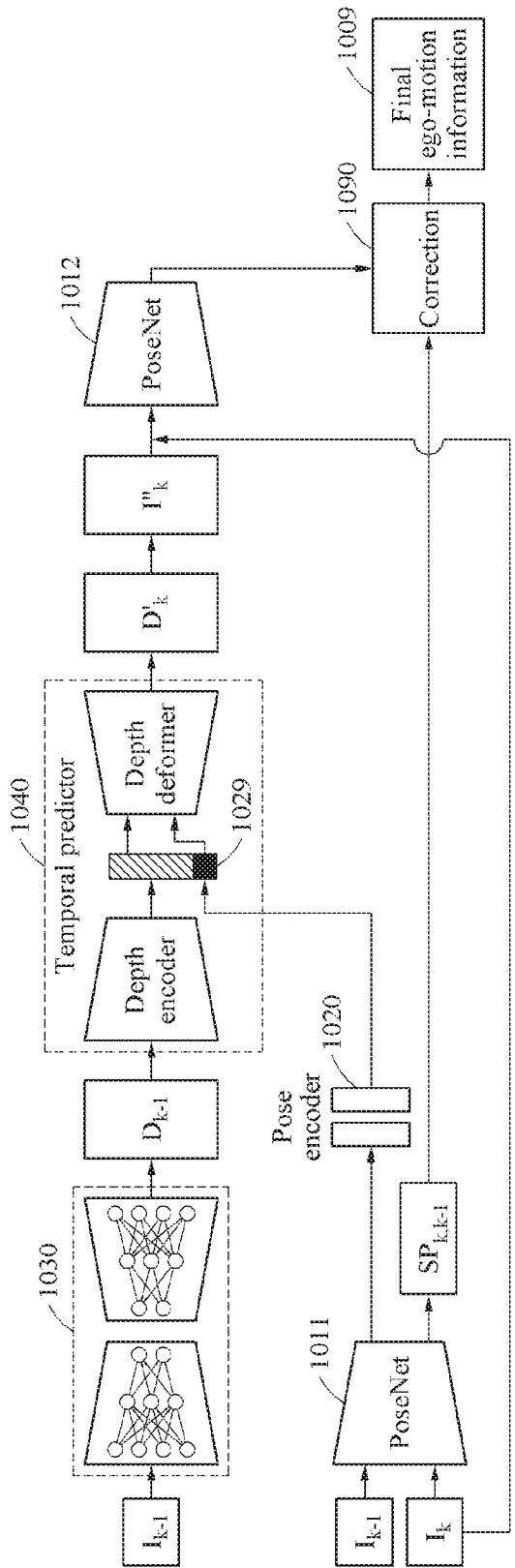

In operation 820, the ego-motion information estimating apparatus generates a restored frame image corresponding to the current frame from at least one of a previous frame image and a depth image generated from a previous frame, based on the extracted short-term ego-motion feature and a deformation model. FIG. 9 illustrates an example of generating a restored frame image from a previous frame image, and FIG. 10 illustrates an example of generating a restored frame image from a depth image. When a frame image of an input image is a color image, a restored frame image may be a color image having the same color system as the input image.

In operation 830, the ego-motion information estimating apparatus calculates correction information from the restored frame image and the current frame image. For example, the ego-motion information estimating apparatus calculates the correction information from the restored frame image and the current frame image based on the ego-motion model. The restored frame image is an image recovered for the same frame as the current frame image and thus, may be the same as the current frame image. Thus, ideally, when the restored frame image and the current frame image are input to the ego-motion model, no pose difference, for example, pose error may be output. However, in practice, an error may occur. Such error may be used as the correction information.

In operation 840, the ego-motion information estimating apparatus calculates final short-term ego-motion information by applying the correction information to the short-term ego-motion information of the current frame estimated based on the ego-motion model.

FIGS. 9 and 10 illustrate processes of estimating ego-motion information.

Referring to FIG. 9. an ego-motion information estimating apparatus may calculate short-term ego-motion information $SP_{k,k-1}$ from a $(k-1)^{th}$ frame image $I_{k-1}$ and a $k^{th}$ frame image $I_k$ based on an ego-motion model 911. In this example, the ego-motion information estimating apparatus may encode a short-term ego-motion feature 929 corresponding to an output of a layer before the short-term ego-motion information $SP_{k,k-1}$ is output, based on a pose encoder 920.

The ego-motion information estimating apparatus may generate a restored frame image $I'_k$ corresponding to a $k^{th}$ frame using the short-term ego-motion feature 929 encoded from the $(k-1)^{th}$ frame image $I_{k-1}$ based on a deformation model 930. For example, the ego-motion information estimating apparatus may extract an image feature of the $(k-1)^{th}$ frame image through an image encoder of the deformation model 930, and restore data obtained by concatenating the extracted image feature with the encoded short-term ego-motion feature 929, to be the restored frame image $I'_k$ using an image deformer.

The ego-motion information estimating apparatus may calculate the correction information corresponding to a fine pose error between the restored frame image $I'_k$ and the $k^{th}$ frame image $I_k$ based on an ego-motion model 912. The ego-motion information estimating apparatus applies the correction information to the short-term ego-motion information $SP_{k,k-1}$ corresponding to the current frame as an operation of correction 990, thereby calculating final short-term ego-motion information 909. Here, the ego-motion models 911 and 912 may be the same parameter having the same structure, but is not limited thereto.

Referring to FIG. 10, similar to the example of FIG. 9, an ego-motion information estimating apparatus calculates short-term ego-motion information $SP_{k,k-1}$ from a $(k-1)^{th}$ frame image $I_{k-1}$ and a $k^{th}$ frame image $I_k$ based on an ego-motion model 1011. In this example, the ego-motion information estimating apparatus encodes short-term ego-motion feature 1029 corresponding to an output of a layer before the short-term ego-motion information $SP_{k,k-1}$ is output, based on a pose encoder 1020.

The ego-motion information estimating apparatus generates a depth image $D_{k-1}$ corresponding to a $(k-1)^{th}$ frame from the $(k-1)^{th}$ frame image $I_{k-1}$. The ego-motion information estimating apparatus restores a depth image $D_k$ corresponding to a $k^{th}$ frame from the depth image $D_{k-1}$ corresponding to the $(k-1)^{th}$ frame using the short-term ego-motion feature 1029 based on a depth deformation model 1040, and generates a restored frame image $I''_k$ corresponding to the $k^{th}$ frame from the depth image $D_k$ corresponding to the $k^{th}$ frame. For example, the ego-motion information estimating apparatus extracts a depth feature of the depth image $D_{k-1}$ corresponding to the $(k-1)^{th}$ frame through a depth encoder of a deformation model 1030 and restores data obtained by concatenating the extracted depth feature with the encoded short-term ego-motion feature 1029, to be the depth image $D'_k$ through a depth deformer.

The ego-motion information estimating apparatus calculates correction information corresponding to a fine pose error between the restored frame image $I''_k$ and the $k^{th}$ frame image $I_k$ based on an ego-motion model 1012. The ego-motion information estimating apparatus applies the correction information to the short-term ego-motion information $SP_{k,k-1}$ corresponding to a current frame as an operation of a correction 1090, thereby calculating final short-term ego-motion information 1009. Here, the ego-motion models 1011 and 1012 may be the same parameter having the same structure, but not be limited thereto.

Figure 11:
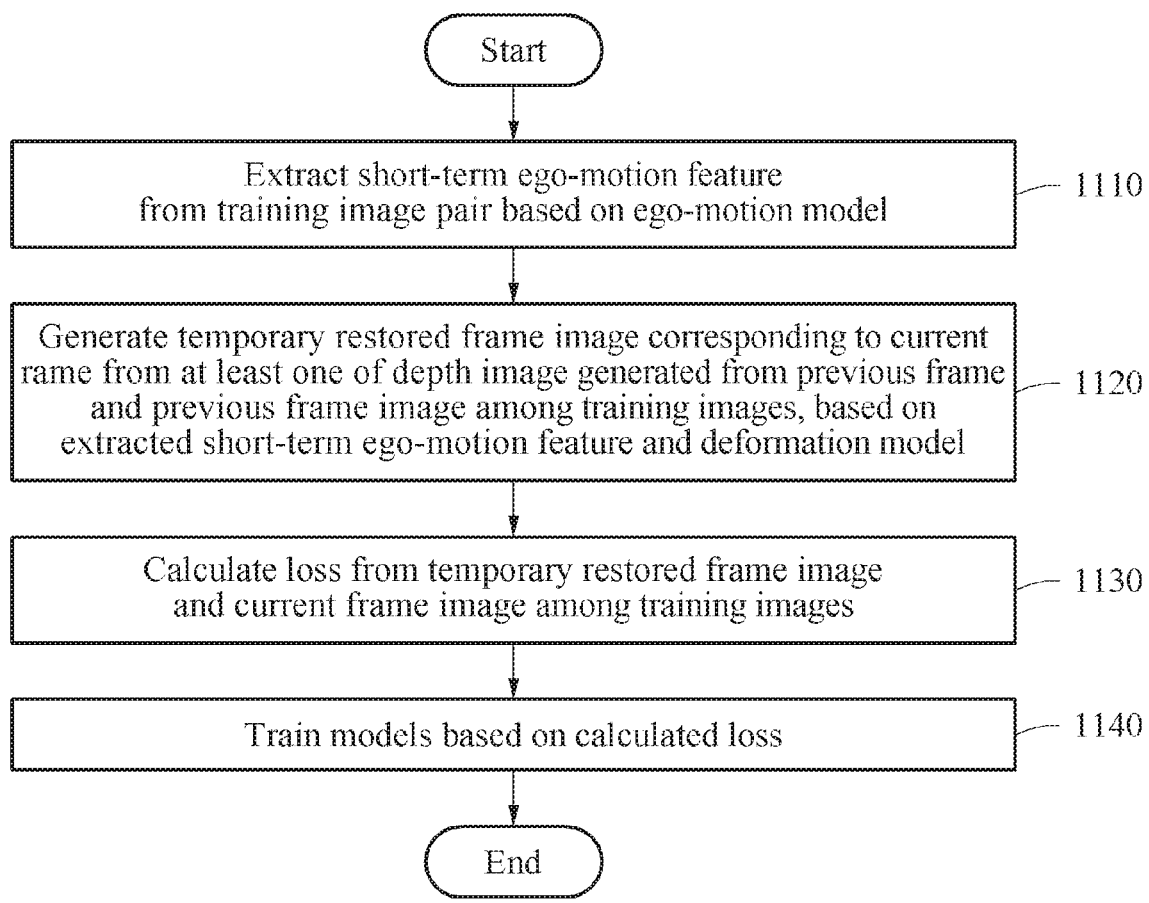
FIG. 11 illustrates an example of a training method of a model.
Figure 12:
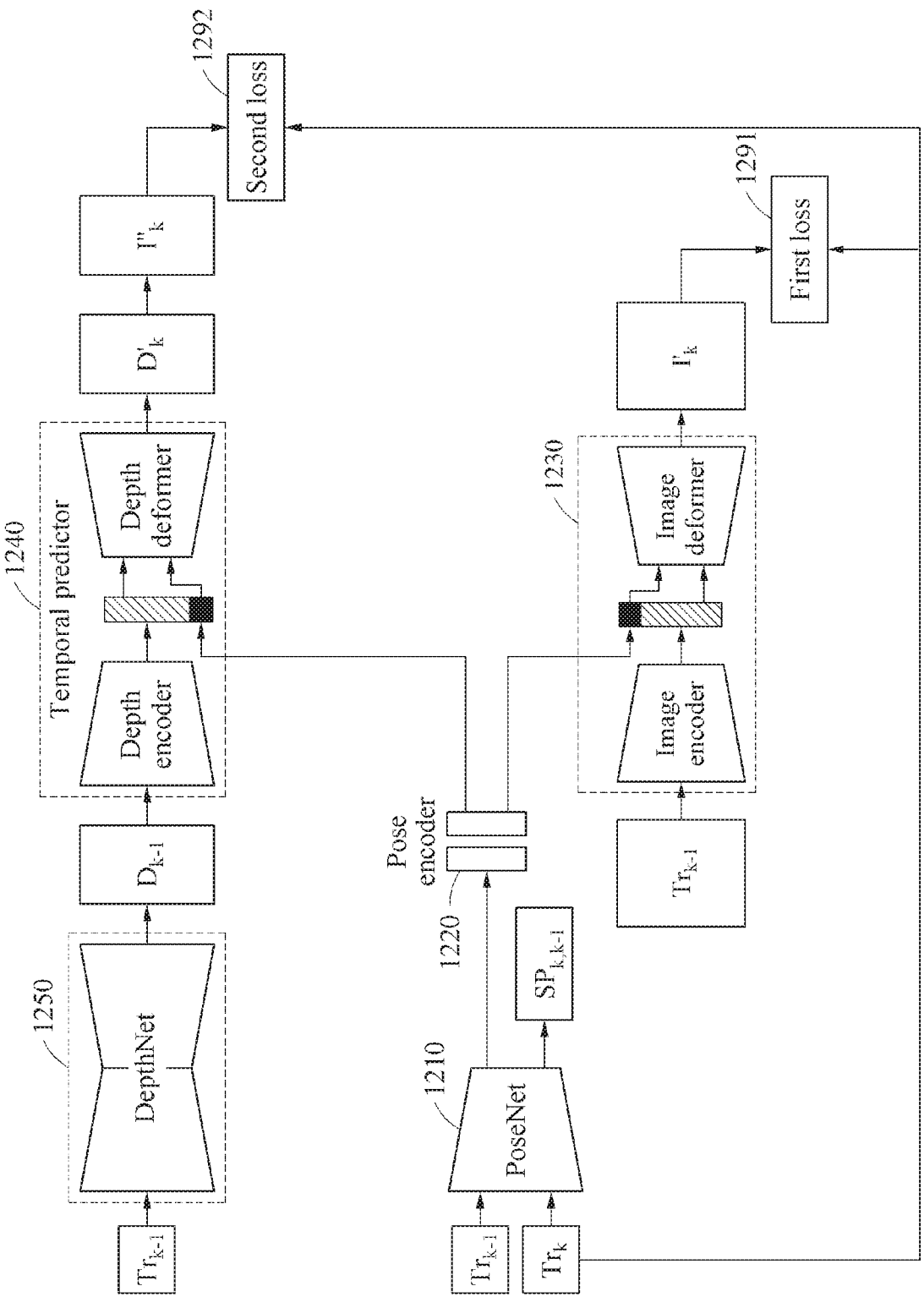
FIG. 12 illustrates an example of a process of training a model.

FIG. 11 illustrates a training method of a model (e.g., a model having a combination of structures of FIGS. 9 and 10). FIG. 12 illustrates a process of training a model (e.g., the model having the combination of the structures of FIGS. 9 and 10).

In operation 1110, an ego-motion information estimating apparatus extracts a short-term ego-motion feature from a training image pair, for example, $Tr_{k-1}$ and $Tr_k$, based on an ego-motion model. The training image pair include a training image $Tr_{k-1}$ of a $(k-1)^{th}$ frame and a training image $Tr_k$ of a $k^{th}$ frame.

In operation 1120, the ego-motion information estimating apparatus generates a temporary restored frame image corresponding to a current frame from at least one of a depth image generated from a previous frame image and a depth image generated from the previous frame image among training images, based on the extracted short-term ego-motion feature and a deformation model. The ego-motion information estimating apparatus extracts a short-term ego-motion feature from the training image pair $Tr_{k-1}$ and $Tr_k$ based on an ego-motion model 1210, encodes the extracted short-term ego-motion feature using a pose encoder 1220, and forwards the encoded short-term ego-motion feature to an image deformation model 1230 and a depth deformation model 1240. The ego-motion information estimating apparatus converts a depth image $D_{k-1}$ extracted from a depth model 1250 into a depth image $D_k$ of a subsequent frame based on the depth deformation model 1240 and the short-term ego-motion feature, and generates a second temporary restored frame image $I''_k$. Likewise, the ego-motion information estimating apparatus generates a first temporary restored frame image $I'_k$ of the subsequent frame from a training image based on the image deformation model 1230 and the short-term ego-motion feature.

In operation 1130, the ego-motion information estimating apparatus calculates a loss from the temporary restored frame image and a current frame image among the training images. The ego-motion information estimating apparatus calculates a first loss 1291 between the first temporary restored frame image $I'_k$ and a first training image $Tr_k$, for example, a loss L1 corresponding to a difference between pixel values. Also, the ego-motion information estimating apparatus calculates a second loss 1292 between the second temporary restored frame image $I''_k$ and the first training image $Tr_k$, for example, the loss L1 corresponding to a difference between pixel values.

In operation 1140, the ego-motion information estimating apparatus trains models based on the calculated loss. For example, the ego-motion information estimating apparatus repetitively updates a parameter of each model until the calculated losses converge to a predetermined value.

Figure 13:
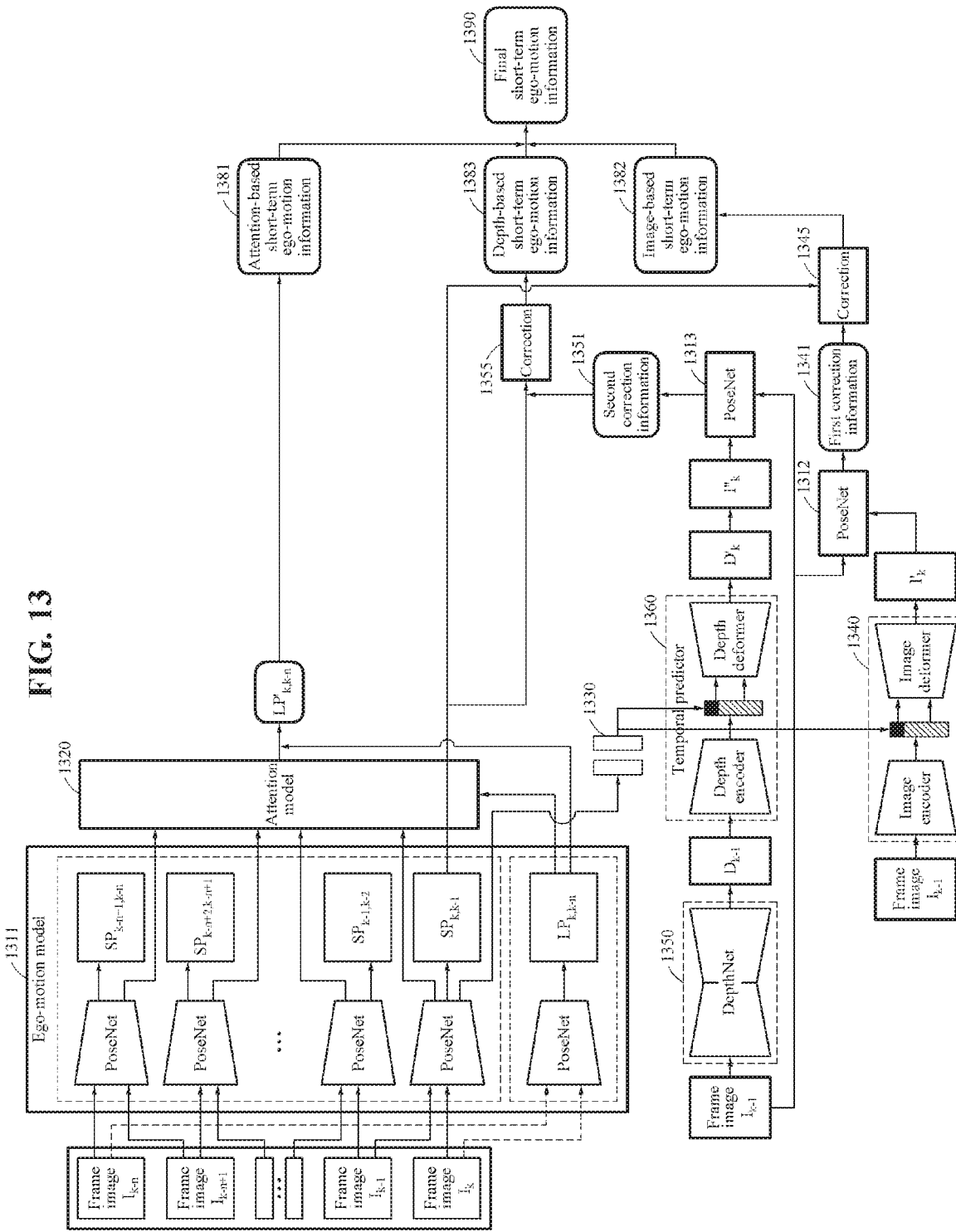
FIG. 13 illustrates an example of a process of estimating ego-motion information.

FIG. 13 illustrates a process of estimating ego-motion information.

An ego-motion information estimating apparatus using a model having a combination of the structures of FIGS. 3, 9, and 10 will be described.

Similar to the example of FIG. 3, the ego-motion information estimating apparatus calculates final long-term ego-motion information $LP'_{k,k-n}$ from frame images based on a first ego-motion model 1311 and an attention model 1320. According to Equation 3 described above, the ego-motion information estimating apparatus calculates attention-based short-term ego-motion information 1381, for example, $SP_{k,k-1}$ from the final long-term ego-motion information $LP'_{k,k-n}$.

The ego-motion information estimating apparatus extracts a short-term ego-motion feature of a sensor from a previous frame image $I_{k-1}$ and a current frame image $I_k$ among the frame images based on the first ego-motion model 1311. The extracted short-term ego-motion feature is encoded by an image encoder 1330 and transferred to an image deformation model 1340 and a depth deformation model 1360. The ego-motion information estimating apparatus generates a restored frame image $I'_k$ corresponding to the current frame by deforming the previous frame image $I_{k-1}$ based on the image deformation model 1340 and the short-term ego-motion feature. The ego-motion information estimating apparatus calculates first correction information 1341 from the current frame image $I_k$ and the restored frame image $I'_k$ based on a second ego-motion model 1312. The ego-motion information estimating apparatus generates image-based short-term ego-motion information 1382 through a correction 1345 performed by applying the first correction information 1341 to the short-term ego-motion information $SP_{k,k-1}$ of the current frame.

The ego-motion information estimating apparatus extracts a short-term ego-motion feature $SP_{k,k-1}$ of the sensor from the previous frame image $I_{k-1}$ and the current frame image $I_k$ among the frame images based on the first ego-motion model 1311. The ego-motion information estimating apparatus generates a depth image $D_{k-1}$ corresponding to a previous frame from the previous frame image $I_{k-1}$ based on a depth model 1350. The ego-motion information estimating apparatus generates a depth image $D'_k$ corresponding to the current frame by deforming the depth image $D_{k-1}$ corresponding to the previous image using the short-term ego-motion feature. The ego-motion information estimating apparatus converts the depth image $D'_k$ corresponding to the current frame into the restored frame image $I''_k$. The ego-motion information estimating apparatus calculates second correction information 1351 from the current frame image $I_k$ and the restored frame image $I''_k$ based on a third ego-motion model 1313. The ego-motion information estimating apparatus generates the depth-based short-term ego-motion information 1383 through a correction 1355 performed by applying the second correction information 1351 to the short-term ego-motion information $SP_{k,k-1}$ corresponding to the current frame.

The ego-motion information estimating apparatus determines final short-term ego-motion information 1390 based on the image-based short-term ego-motion information 1382 and the attention-based short-term ego-motion information 1381 calculated from the final long-term ego-motion information. The ego-motion information estimating apparatus determines the final short-term ego-motion information 1390 based on the depth-based short-term ego-motion information 1383 and the attention-based short-term ego-motion information 1381 calculated from the final long-term ego-motion information. The ego-motion information estimating apparatus determines the final short-term ego-motion information 1390 corresponding to the current frame based on the attention-based short-term ego-motion information 1381, the image-based short-term ego-motion information 1382, and the depth-based short-term ego-motion information 1383.

Figure 14:
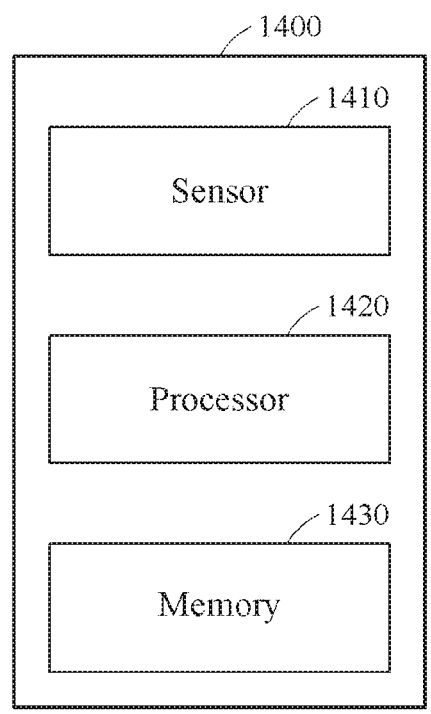
FIGS. 14 and 15 illustrate examples of ego-motion information estimating apparatuses.
Figure 15:
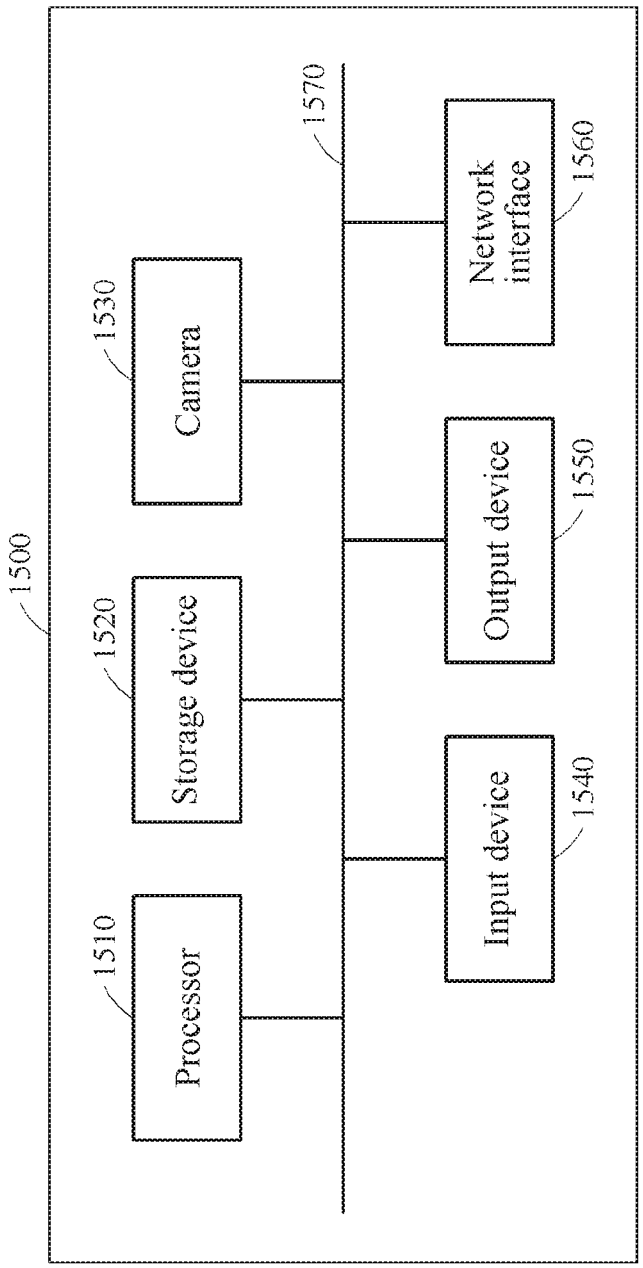

FIGS. 14 and 15 illustrate an ego-motion information estimating apparatuses.

An ego-motion information estimating apparatus 1400 includes a sensor 1410, a processor 1420 (i.e., one or more processors), and a memory 1430.

The sensor 1410 acquires frame images of consecutive frames. For example, the sensor 1410 may be a camera sensor 1410 that receives a color image but is not limited thereto. The sensor 1410 may acquire a stereo image. The sensor 1410 may further include a depth sensor 1410 that receives a depth image. When viewing angles are matched such that pixels of images acquired by the depth sensor 1410 and the camera sensor 1410 indicate the same point, the depth image acquired by the depth sensor 1410 may be used in a training process. In this example, instead of a depth image generated from a depth model, the depth model acquired by the depth sensor 1410 is used in the training process.

The processor 1420 estimates short-term ego-motion information of the sensor 1410, estimates long-term ego-motion information of the sensor 1410 from the frame images, calculates attention information from the short-term ego-motion information and the long-term ego-motion information, corrects the long-term ego-motion information based on the attention information, and determines final long-term ego-motion information of a current frame. The processor 1420 is configured to perform any one, any combination, or all of the operations described with reference to FIGS. 1 through 13, in respective embodiments.

The memory 1430 temporarily or permanently stores data used for estimating ego-motion information. The memory 1430 stores the frame images acquired by the sensor 1410, the short-term ego-motion information, and the long-term ego-motion information for a predetermined interval, for example, n frames.

Referring to FIG. 15, a computing apparatus 1500 is an apparatus for estimating an ego-motion of a sensor using the ego-motion information estimating method described herein. In an example, the computing apparatus corresponds to the ego-motion information estimating apparatus 1400 of FIG. 14. The computing apparatus 1500 may be, for example, an image processing device, a smartphone, a wearable device, a tablet computer, a netbook, a laptop, a desktop, a personal digital assistant (PDA), an HMD, and the like.

Referring to FIG. 15, the computing apparatus 1500 includes a processor 1510, a storage device 1520, a camera 1530, an input device 1540, an output device 1550, and a network interface 1560. The processor 1510, the storage device 1520, the camera 1530, the input device 1540, the output device 1550, and the network interface 1560 may communicate with one another through a communication bus 1570.

The processor 1510 executes functions and instructions in the computing apparatus 1500. For example, the processor 1510 processes instructions stored in the storage device 1520. The processor 1510 performs one or more operations described above with reference to FIGS. 1 through 14.

The storage device 1520 stores information and data needed for execution of the processor. The storage device 1520 includes a computer-readable storage medium or computer-readable storage device. The storage device 1520 stores instructions to be executed by the processor 1510, and stores related information while software or an application is being executed by the computing apparatus 1500.

The camera 1530 captures an image including a plurality of image frames. For example, the camera 1530 generates a frame image.

The input device 1540 receives an input from a user through a tactile, video, audio, or touch input. The input device 1540 includes, for example, a keyboard, a mouse, a touchscreen, a microphone, and other devices that may detect an input from a user and transmit the detected input.

The output device 1550 provides an output of the computing apparatus 1500 to a user through a visual, auditory, or tactile channel. The output device 1550 includes, for example, a display, a touchscreen, a speaker, a vibration generator, and other devices that may provide an output to a user. The network interface 1560 communicates with an external device through a wired or wireless network. The output device 1550 outputs at least one of the final short-term ego-motion information, the final long-term ego-motion information, the position information, and the pose information calculated in the examples of FIGS. 1 through 13. The output device 1550 provides the final short-term ego-motion information, the final long-term ego-motion information, the position information, and the pose information to a user using at least one of visual information, auditory information, and haptic information. In various corresponding embodiments, when the computing apparatus 1500 is, or is mounted in/on, a mobile user device, a robotic device, or a vehicle, the computing apparatus 1500 is configured to estimate a position and a pose of the mobile user device, robotic device, or vehicle based on the final short-term ego-motion information and the final long-term ego-motion information, generate graphical representations, for example, a user/device or vehicle object on a generated map background, corresponding to the estimated position and the pose, and visualize the graphical representations on the display, and/or use the estimated position and pose of the mobile user device, robotic device, or vehicle to control locational mapping (e.g., simultaneous localization and mapping (SLAM)) and control autonomous movement of the robotic device or vehicle based on the same, as non-limiting examples.

Figure 16:
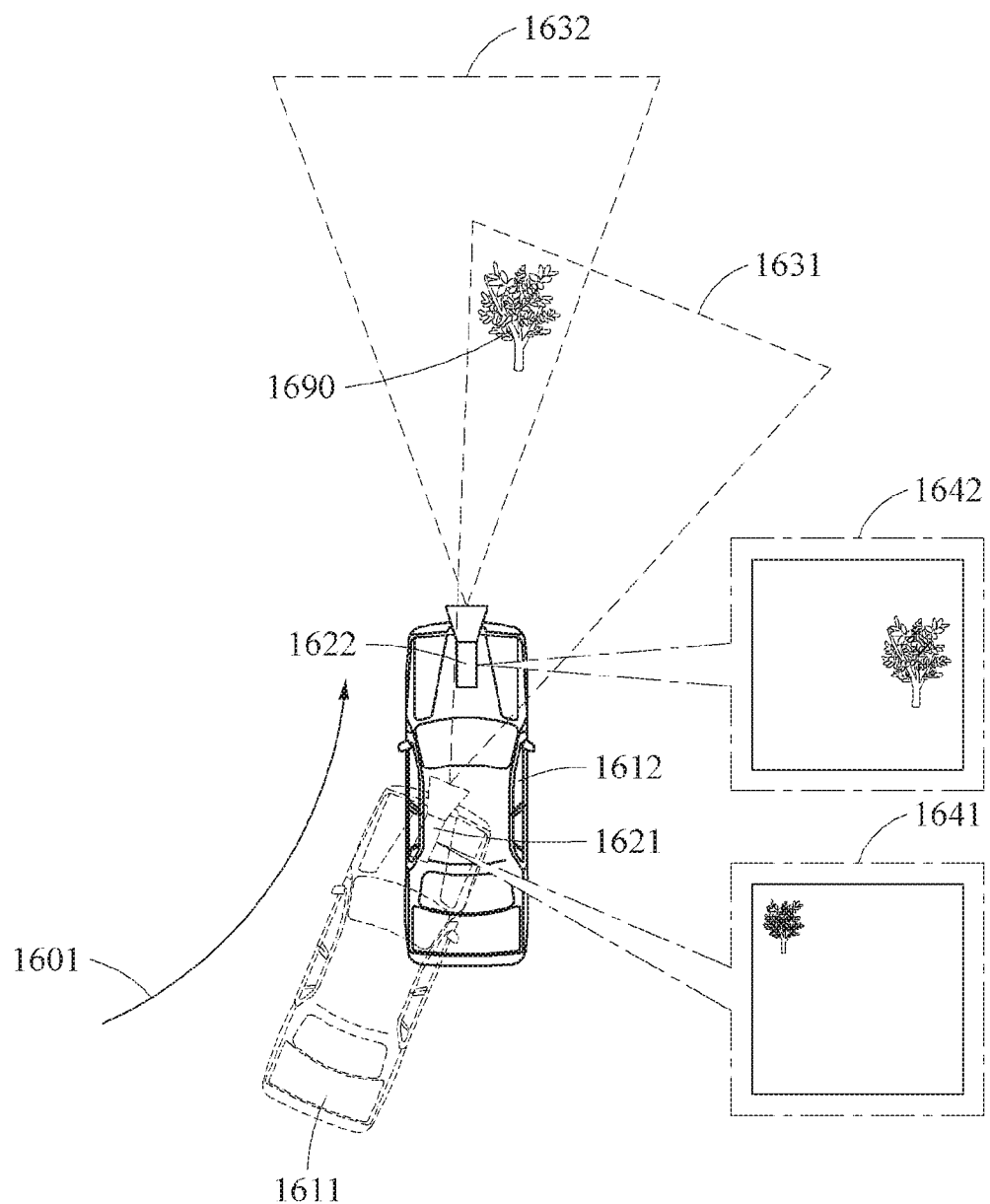
FIG. 16 illustrates an example of an ego-motion information estimating apparatus mounted in a vehicle.

FIG. 16 illustrates an example of an apparatus for estimating ego-motion information mounted in a vehicle.

When an ego-motion information estimating apparatus is mounted in a vehicle, a sensor 1621 and 1622 may be arranged to be directed from an inside to an outside of the vehicle. For example, an optical axis and an FOV of the sensor may be disposed to face a front view of the vehicle. FIG. 16 illustrates a situation 1601 in which the vehicle moves from a first position to a second position, for example, a left-turn. When an object 1690 is present in front of the vehicle, the object 1690 appears in a left part of a first frame image 1641, at a first FOV 1631 of the sensor 1621 at a first position 1611. Also, the object 1690 appears in a right part of a second frame image 1642, at a second FOV 1632 of the sensor 1622 at a second position 1612. As such, the ego-motion information estimating apparatus may estimate ego-motion information of the sensor based on a change of an object or a static background from one frame image to another (e.g., from the first frame image 1641 to the second frame image 1642).

As described with reference to FIGS. 1 through 15, the ego-motion information estimating apparatus may track a travel path of a device including the sensor based on at least one of final long-term ego-motion information and final short-term ego-motion information calculated from the final long-term ego-motion information. The ego-motion information estimating apparatus may set a predetermined geographical position or a physical position to be an origin as a reference position, set a reference pose, accumulate applications of the final short-term ego-motion information and/or the final long-term ego-motion information to the reference position and the reference pose, and determine a position and a pose of the device in each frame. For example, the ego-motion information estimating apparatus may initialize a position and a pose of the device in a predetermined initialization frame. The ego-motion information estimating apparatus may set the position and the pose of the device in the initialization frame to be a reference position and a reference pose. In a frame subsequent to the initialization frame, the ego-motion information estimating apparatus may apply final short-term ego-motion information determined in the subsequent frame to the reference position and the reference pose in the initialization frame, thereby calculating a position and a pose in the subsequent frame. For example, the ego-motion information estimating apparatus may acquire a matrix indicating a pose and a position of the device in the subsequent frame from a result of matrix product calculation between a matrix indicating the position and the pose of the device and a matrix indicating the final short-term ego-motion information, for example, a matrix having the same form as Equation 1. Thereafter, similarly to the foregoing, for each frame, the ego-motion information estimating apparatus may determine a position and a pose of the device corresponding to the current frame by applying the short-term ego-motion information to the pose and the position of the device determined in the previous frame. The ego-motion information estimating apparatus may track a pose at each position and a travel path of the device by accumulating poses and positions determined in corresponding frames.

Information associated with a pose and a position of the device is not limited to a form of a matrix and other types of data may also be used. Although the final short-term ego-motion information may be applied to the pose and the position in the previous frame through the matrix product calculation as an example, other operations may also be used. Also, although the final short-term ego-motion information may be used as an example, embodiments are not limited thereto. By applying the final long-term ego-motion information to a pose and a position corresponding to the long-term reference frame of the current frame, the ego-motion information estimating apparatus may also determine a pose and a position of the device corresponding to the current frame.

The ego-motion information estimating apparatus may output the tracked travel path of the device. For example, the ego-motion information estimating apparatus may output a graphical representation indicating a geographical map of a terrain around the device using a display (for example, a display of either one or both of the sensor and the vehicle), overlay a graphical representation corresponding to the tracked travel path on the graphical representation corresponding to the geographical map, and outputs a result of the overlaying. However, a visualization of the output of the travel path is not limited thereto. The travel path may also be output as auditory or tactile information.

In an example, the ego-motion information estimating apparatus may be implemented as a head-mounted device (HMD), configured to provide augmented or virtual reality information. In this example, a display of an HMD device is disposed to face an eye of a user. Also, a sensor is disposed to face an opposite side of the display based on a housing of the device. In other words, the sensor is disposed in the same direction as a gaze direction of the user. Since the ego-motion information estimating apparatus moves according to a movement of a head of the user, the ego-motion information estimating apparatus estimates a movement of the head of the user based on ego-motion information of the sensor. The ego-motion information estimating apparatus estimates the ego-motion information of the sensor using the method described with reference to FIGS. 1 through 15 and feeds the estimated ego-motion information back to contents visualized on the display. For example, the ego-motion information estimating apparatus sets a pose and a position of the HMD in an initialization frame as a reference pose and a reference position. After that, the ego-motion information estimating apparatus accumulates applications of final short-term ego-motion information and/or final long-term ego-motion information to the reference pose and the reference position in subsequent frames, thereby determining a pose and position of the HMD in each frame. Also, when a motion of the user rotating the head in a predetermined, for example, rightward direction is detected from the ego-motion information of the sensor, the ego-motion information estimating apparatus controls the HMD to display virtual contents corresponding to the direction.

The apparatuses, apparatus 1400, apparatus 1500, processors, processor 1420, processor 1510, sensors, sensor 1410, sensor 1621, sensor 1622, camera 1530, memories, memory 1430, storage device 1520, input device 1540, output device 1550, network interface 1560, bus 1570, units, modules, devices, and other components described herein with respect to FIGS. 1-15 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
    estimating, from frame images of consecutive frames acquired from one or more sensors, short-term ego-motion information of the one or more sensors;
    estimating long-term ego-motion information of the one or more sensors from the frame images;
    determining attention information from the short-term ego-motion information and the long-term ego-motion information;
    determining final long-term ego-motion information of a current frame, of the consecutive frames, based on the long-term ego-motion information and the attention information; and
    tracking a travel path of a device to which the one or more sensors are mounted, based on the final long-term ego-motion information.

2. The method of claim 1, wherein the determining of the final long-term ego-motion information of the current frame comprises correcting the long-term ego-motion information using the attention information.

3. The method of claim 1, wherein
    the determining of the final long-term ego-motion information comprises determining an ego-motion variation of the one or more sensors from a long-term reference frame to the current frame, and
    a frame before a predetermined number of frames from the current frame is determined as the long-term reference frame.

4. The method of claim 1, further comprising:
    determining final short-term ego-motion information of the current frame based on the determined final long-term ego-motion information.

5. The method of claim 4, wherein the determining of the final short-term ego-motion information comprises:
    determining the final short-term ego-motion information of the current frame based on final long-term ego-motion information of a frame previous to the current frame among the consecutive frames, final short-term ego-motion information of a long-term reference frame, and the final long-term ego-motion information of the current frame.

6. The method of claim 5, wherein the frame previous to the current frame is directly adjacent to the current frame among the consecutive frames.

7. The method of claim 1, wherein the estimating of the short-term ego-motion information of the one or more sensors comprises:
    estimating, using an ego-motion model, short-term ego-motion information between the current frame and a short-term reference frame in response to receiving a current frame image of the current frame; and
    estimating the short-term ego-motion information of the one or more sensors based on the estimated short-term ego-motion information between the current frame and the short-term reference frame.

8. The method of claim 1, wherein the estimating of the long-term ego-motion information of the one or more sensors comprises:
    estimating, using an ego-motion model, long-term ego-motion information between the current frame and a long-term reference frame in response to receiving a current frame image of the current frame; and
    estimating the long-term ego-motion information of the one or more sensors based on the estimated long-term ego-motion information between the current frame and the long-term reference frame.

9. The method of claim 1, wherein
    the estimating of the short-term ego-motion information comprises estimating, using a short-term ego-motion model, the short-term ego-motion information from a consecutive frame image pair among the frame images,
    the estimating of the long-term ego-motion information comprises estimating, using a long-term ego-motion model, the long-term ego-motion information from a target frame image of the current frame and a reference frame image among the frame images, and
    the short-term ego-motion model has a different configuration from the long-term ego-motion model at least with respect to having respective different trained parameters.

10. The method of claim 1, wherein the determining of the attention information comprises:
    extracting, using an attention model, the attention information from the short-term ego-motion information and the long-term ego-motion information.

11. The method of claim 10, wherein the extracting of the attention information comprises:
    extracting an attention element from the short-term ego-motion information and the long-term ego-motion information;
    extracting an attention weight from the short-term ego-motion information; and
    generating the attention information based on the attention element and the attention weight.

12. The method of claim 1, further comprising:
    determining the short-term ego-motion information to be final short-term ego-motion information in response to a number of frame images collected from an initial frame to a current frame being less than a determined frame number.

13. The method of claim 1, further comprising:
    extracting, using an ego-motion model, a short-term ego-motion feature of the one or more sensors from a current frame image of the current frame and a frame image previous to the current frame image among the frame images;

generating, using an image deformation model, a restored frame image of the current frame by deforming the previous frame image based on the short-term ego-motion feature;

calculating, using the ego-motion model, correction information from the current frame image and the restored frame image; and generating image-based short-term ego-motion information by applying the correction information to short-term ego-motion information of the current frame.

14. The method of claim 13, wherein the correction information corresponds to a fine pose error between the restored frame image and the current frame image.

15. The method of claim 13, further comprising:
determining final short-term ego-motion information based on attention-based short-term ego-motion information calculated from the final long-term ego-motion information and the image-based short-term ego-motion information.

16. The method of claim 1, further comprising:
extracting, using an ego-motion model, a short-term ego-motion feature of the one or more sensors from a current frame image of the current frame and a frame image previous to the current frame image among the frame images;

generating a depth image of a frame previous to the current frame from the previous frame image;

generating a depth image corresponding to the current frame by deforming the depth image of the previous frame based on the short-term ego-motion feature;

converting the depth image corresponding to the current frame into a restored frame image;

calculating, using the ego-motion model, correction information from the current frame image and the restored frame image; and generating depth-based short-term ego-motion information by applying the correction information to short-term ego-motion information of the current frame.

17. The method of claim 15, further comprising:
determining final short-term ego-motion information based on attention-based short-term ego-motion information calculated from the final long-term ego-motion information and the depth-based short-term ego-motion information.

18. The method of claim 1, further comprising:
outputting the tracked travel path of the device,
wherein the tracking comprises tracking the travel path based on at least one of the final long-term ego-motion information and final short-term ego-motion information calculated from the final long-term ego-motion information.

19. The method of claim 1, further comprising:
generating, using a depth model, temporary depth information of a frame previous to the current frame from training images;

generating, using an ego-motion model and an attention model, temporary long-term ego-motion information from the training images;

calculating temporary short-term ego-motion information from the temporary long-term ego-motion information;

generating a warped image of a current frame based on the temporary short-term ego-motion information and the temporary depth information of the previous frame; and training any one or any combination of any two or more of the ego-motion model, the attention model, and the depth model based on a loss calculated from the warped image and a current frame image among the training images.

20. The method of claim 19, wherein the generating of the warped image comprises:
generating a three-dimensional (3D) coordinate image corresponding to the previous frame from the temporary depth information;

restoring a 3D coordinate image corresponding to a current frame by converting the 3D coordinate image corresponding to the previous frame using the temporary short-term ego-motion information calculated from the temporary long-term ego-motion information; and generating the warped image by projecting the 3D coordinate image corresponding to the current frame two-dimensionally such that the warped image is two dimensionally warped.

21. A non-transitory computer-readable storage medium storing instructions that, when executed by one or more processors, cause the one or more processors to perform the method of claim 1.

22. A processor-implemented method, the method comprising:
extracting, using an ego-motion model, a short-term ego-motion feature from a current frame image and a previous frame image acquired from one or more sensors;

generating, using a deformation model, a restored frame image corresponding to a current frame from at least one image between the previous frame image and a depth image generated from the previous frame image, based on the extracted short-term ego-motion feature;

calculating correction information from the restored frame image and the current frame image;

calculating, using the ego-motion model, final short-term ego-motion information by applying the correction information to short-term ego-motion information of the current frame estimated; and tracking a travel path of a device to which the one or more sensors are mounted, based on the final short-term ego-motion information.

23. An apparatus, the apparatus comprising:
one or more sensors configured to acquire frame images of consecutive frames; and one or more processors configured to estimate short-term ego-motion information of the one or more sensors, estimate long-term ego-motion information of the one or more sensors from the frame images, calculate attention information from the short-term ego-motion information and the long-term ego-motion information, determine final long-term ego-motion information of a current frame by correcting the long-term ego-motion information based on the attention information, and determine a travel path of the one or more sensors, based on the final long-term ego-motion information.

24. The apparatus of claim 23, wherein
the one or more sensors comprise one or more image sensors.

* * * * *